United States Patent
Van Buren et al.

(10) Patent No.: US 6,667,816 B1
(45) Date of Patent: Dec. 23, 2003

(54) DIGITAL IMAGE PROCESSING APPARATUS AND METHOD WITH STORAGE OF NON-FINISHABLE JOBS

(75) Inventors: Antonius C. M. Van Buren, Velden (NL); Wilhelmus G. J. Volleberg, Venray (NL); Johannes F. M. E. Geelen, Baarlo (NL)

(73) Assignee: Océ-Technologies B.V., Venlo (NL)

( * ) Notice: Subject to any disclaimer, the term of this patent is extended or adjusted under 35 U.S.C. 154(b) by 0 days.

(21) Appl. No.: 09/272,245

(22) Filed: Mar. 19, 1999

(30) Foreign Application Priority Data

Mar. 19, 1998 (NL) .............................................. 1008643
Dec. 24, 1998 (EP) ............................................ 98204471

(51) Int. Cl.⁷ ........................ G06K 15/00; G03G 15/00; G06F 17/30
(52) U.S. Cl. .................... 358/3.13; 358/3.14; 358/3.15; 358/3.16; 358/3.17; 399/80; 399/81; 399/411; 707/3; 707/205
(58) Field of Search ............................... 358/3.13, 1.14, 358/1.15, 1.16, 1.17; 399/80, 81, 411; 707/3, 205

(56) References Cited

U.S. PATENT DOCUMENTS

| | | | | |
|---|---|---|---|---|
| 5,068,888 A | * | 11/1991 | Scherk et al. ................ | 358/402 |
| 5,170,397 A | * | 12/1992 | Hurtz et al. ................... | 399/11 |
| 5,999,707 A | * | 12/1999 | Taniguchi et al. .......... | 358/1.15 |
| 6,181,893 B1 | * | 1/2001 | Collard et al. ................ | 399/80 |
| 6,195,170 B1 | * | 2/2001 | Mizutani et al. ........... | 358/1.14 |
| 2002/0036793 A1 | * | 3/2002 | Roosen et al. .............. | 358/1.15 |

FOREIGN PATENT DOCUMENTS

| | | | | |
|---|---|---|---|---|
| EP | 0689157 A2 | * | 12/1995 | .......... G06K/15/00 |
| EP | 0756414 A2 | | 1/1997 | |
| EP | 0814424 A1 | * | 12/1997 | .......... G06K/15/00 |

OTHER PUBLICATIONS

Francis P. Sung et al., 1266 Hewlett–Packard Journal, 45, nr. 2, pp. 53–61 Apr. 1994.

* cited by examiner

*Primary Examiner*—Edward Coles
*Assistant Examiner*—Monica Mitchell
(74) *Attorney, Agent, or Firm*—Birch, Stewart, Kolasch & Birch, LLP

(57) ABSTRACT

In a networked printing environment having at least a number of workstations of users, a management unit maintains logic storage spaces in a memory, each allocated to a respective user. Digital data files sent from a user's workstation for printing contain an identification of the relevant user and are either of a first type or of a second type. The first type is formed by files which must be printed automatically, and the second type is formed by files which must be stored in the logic storage space of the user in the memory and may be printed only on a command from the operator control unit, which command identifies the relevant file. When handling a print job, the management unit checks, whether the job can be performed completely. If this appears not to be the case, the management unit converts the file into a file of the second type and, if necessary, creates a logic storage space for the relevant user and stores the file in the logic storage space of the relevant user. The same techniques are also used for scan and copy jobs. As a result, the file is not lost but remains available. On a command from the apparatus operator control panel, it can be retrieved and the job resumed.

22 Claims, 17 Drawing Sheets

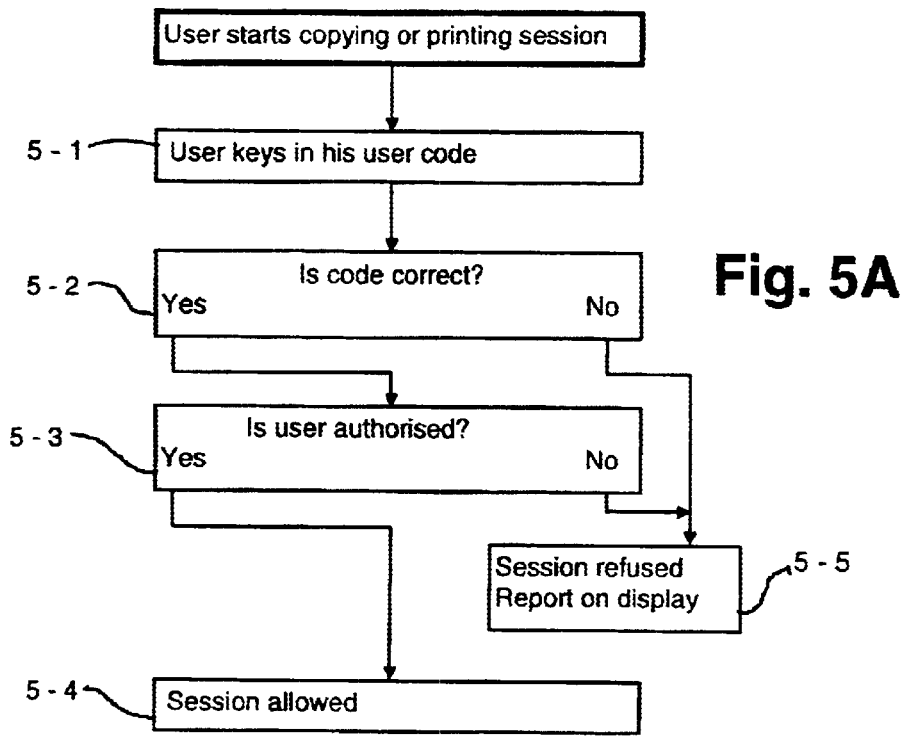
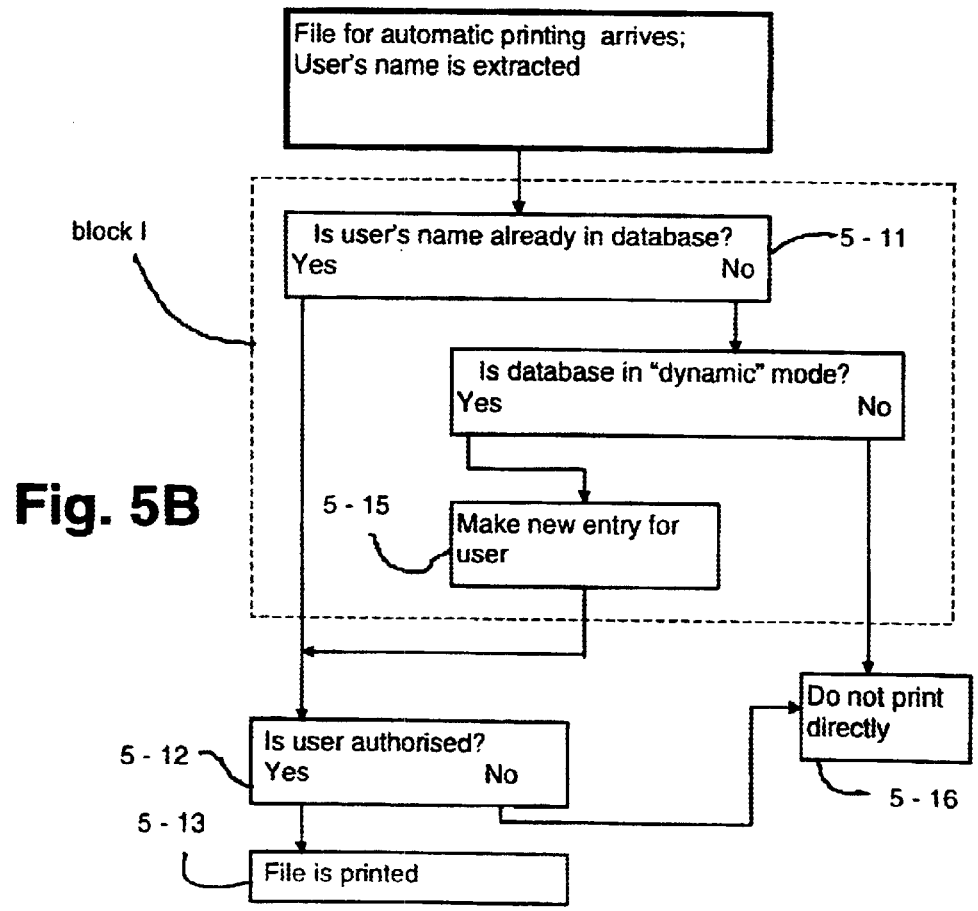

DIGITAL IMAGE PROCESSING APPARATUS AND METHOD WITH STORAGE OF NON-FINISHABLE JOBS

BACKGROUND OF THE INVENTION

1. Technical Field of the Invention

The invention relates to a digital image reproduction apparatus including a digital image processing apparatus for use by a plurality of users. More particularly, the invention relates to a digital image reproduction apparatus including an image conversion unit; a local memory; a local operator control unit, integrated in the apparatus, provided with inputting device and a display, for a user to give operating commands to the apparatus; and a management unit connected to the memory, for controlling image conversion jobs to be performed for a user by the image processing apparatus, the management unit maintaining a plurality of logic storage spaces in the memory, each allocated to a respective user, and the management unit being capable of storing data relating to an image conversion job for a user, in the logic storage space allocated to the user, from which logic storage space the data can exclusively be retrieved upon a command from a user, the command specifying the relevant job.

2. Description of Related Art

A related apparatus is known from Applicants' European Patent Application EP 0 814 424 A. This known apparatus is a digital copier/printer connected to a network, to which also a plurality of user workstations is connected.

Digital data files sent from a user's workstation for printing by this known apparatus are either of a first type or of a second type. The first type is formed by files which must be printed automatically, and the second type is formed by files which must be stored in the logic storage space of the user (sender) in the memory without any further action. A user wishing to have a file of the second type printed must select the relevant job and give a print command, using the buttons on the operator control panel of the device.

In this publication, the processing of a data file of the second type for printing is referred to as "deferred printing", the term "command-controlled mode" also being used. In the following description, this method of processing will be referred to as "interactive printing". The publication also refers to the processing of a data file of the first type as being a "(remote-started) print job", and the term "autonomous mode", while this method will be referred to in the following description as "automatic printing".

It sometimes occurs that a print job of the first type cannot be processed, for instance because:
- the sender of the print job is not authorized to have jobs printed on the particular device
- there is no print paper available of the kind specified in the job
- the job is broken off by a stop command given by an operator at the device
- a non-recoverable machine error takes place.

In many of these cases, the print file is then lost, or it may remain in the memory, waiting till the conditions for printing are met, but blocks the print queue, so that other jobs cannot be printed either.

SUMMARY OF THE INVENTION

An object of the present invention is to remedy these disadvantages. To this end, the management unit, when handling an image conversion job, checks whether the job can be performed completely, and in the case that the job cannot be performed completely, enters the data relating to the job in the logic storage space of the relevant user.

As a result, the file is not lost but remains available. On a command from the apparatus operator control panel, it can be retrieved and resumed. Also, the job is automatically removed from the automatic print queue and therefore cannot block other jobs that might be perfectly fit for printing.

A first embodiment of the invention is directed to authorization of users. Printing machines are frequently equipped with a system which counts the number of prints made per person for the purpose of calculating the costs, the system preventing non-authorised users from making use of the apparatus. Non-authorised users may, for example, be users who have exceeded a permissible maximum number of prints.

If a user is found to be non-authorised when his data file for printing (of the first type, i.e. for automatic printing) arrives in the apparatus, the latter refuses to handle the print job and the file is usually lost. The user must then first bring his authorisation into order and can then re-send a print order with a copy of the data file to the apparatus. The user, who probably does not know that his authorisation has expired, does not find this out until he has walked to the apparatus, and then has to walk back to his workstation to re-send the print order.

According to the present invention, the management unit also maintains a list of authorised users, and when the management unit receives from a user's workstation a file of the first type for printing, the management unit checks whether the relevant user is registered in the list of authorised users, and if so, prints the file, and if not, converts the file to a file of the second type, if necessary creates a logic storage space for the relevant user and stores the file in the logic storage space of the relevant user.

Consequently, although the file for printing (of the first type) is not printed, it nevertheless remains available for printing on a command from the apparatus operator control panel, so that the user does not have to go back to his workstation in order to start the print job again.

The same approach is applied in cases in which printing of a data file is not possible for other reasons. This is the case, for example, if the apparatus manager does not wish to accept any automatic print jobs because they interfere with his handling copy jobs or interactive print jobs. In that case, all the incoming files of the first type for printing are automatically converted to files of the second type, so that at least they are not lost, but can still be processed interactively.

Another case in which a print job cannot be executed is when not all the conditions have been met for printing at the actual start of the printing operation. This is the case, for example, if the print paper specified in the print order is not in stock in the apparatus. Another example is that the print job is programmed for printing on receiving sheets introduced by manual input. If there is no paper present in the manual input when the job is started, the print job cannot be executed. In another embodiment of the present invention, the management unit therefore checks, when a print process is started up for a print file of any of the first or second types, whether all the conditions for the printing are met. If this is not the case, it brings the file into the condition of a file of the second type for printing and stores the file in the logic storage space of the relevant user. This is convenient for a user, who, when he arrives at the apparatus for collecting his prints, discovers that the paper is used up, and his job is not printed at all. Now, he can fill the paper reservoir and can restart the print job without going back to his workstation.

In a further embodiment, the invention is applied to cases in which execution of a job is broken off due to a fatal interruption. By a fatal interruption, an interruption is meant that leads to abortion of the running process.

A first example of a fatal interruption is, when a second user at the device stops the execution of a running print job of a first user who is not present at that moment.

When a running print job is broken off by a user command, the print data are normally deleted, based on a philosophy, that jobs are only broken off if the prints are not desired at all. However, it may well happen that a job is broken-off inadvertently, because another user simply tries to make an interrupt copy job, but uses the wrong buttons. According to the invention, the job data are still preserved, and the job may be printed by the owner at a later time.

Another form of a fatal interruption of a print process may be a fatal error in the print process, more particularly, a mechanical breakdown of the process engine. In those cases, it may take a rather long time before the device can be used again, and saving the print data of the running job into the logical storage space in the memory, of the owner, excludes the risk of loss of the data.

The application of the principles of the invention is not limited to printing processes. In particular, fatal interruptions may also occur during other image conversion processes, such as scanning and copying (copying being a combination of scanning and printing). According to the present invention, also in these processes, when the management unit finds out that a job cannot be performed completely, it saves the image data relating to the process in the logic storage space of the relevant user, so that the job can be resumed or restarted at a later time.

For the convenience of the owner of a broken-off job, an error page may be printed, stating that the job was stopped and for what reason. Also, instructions as to how to restart or resume the job can be printed on the error page.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A and 5B are flow diagrams to explain the operation of the apparatus accounting and security unit according to an embodiment of the invention;

DESCRIPTION OF PREFERRED EMBODIMENTS

Figure 1:
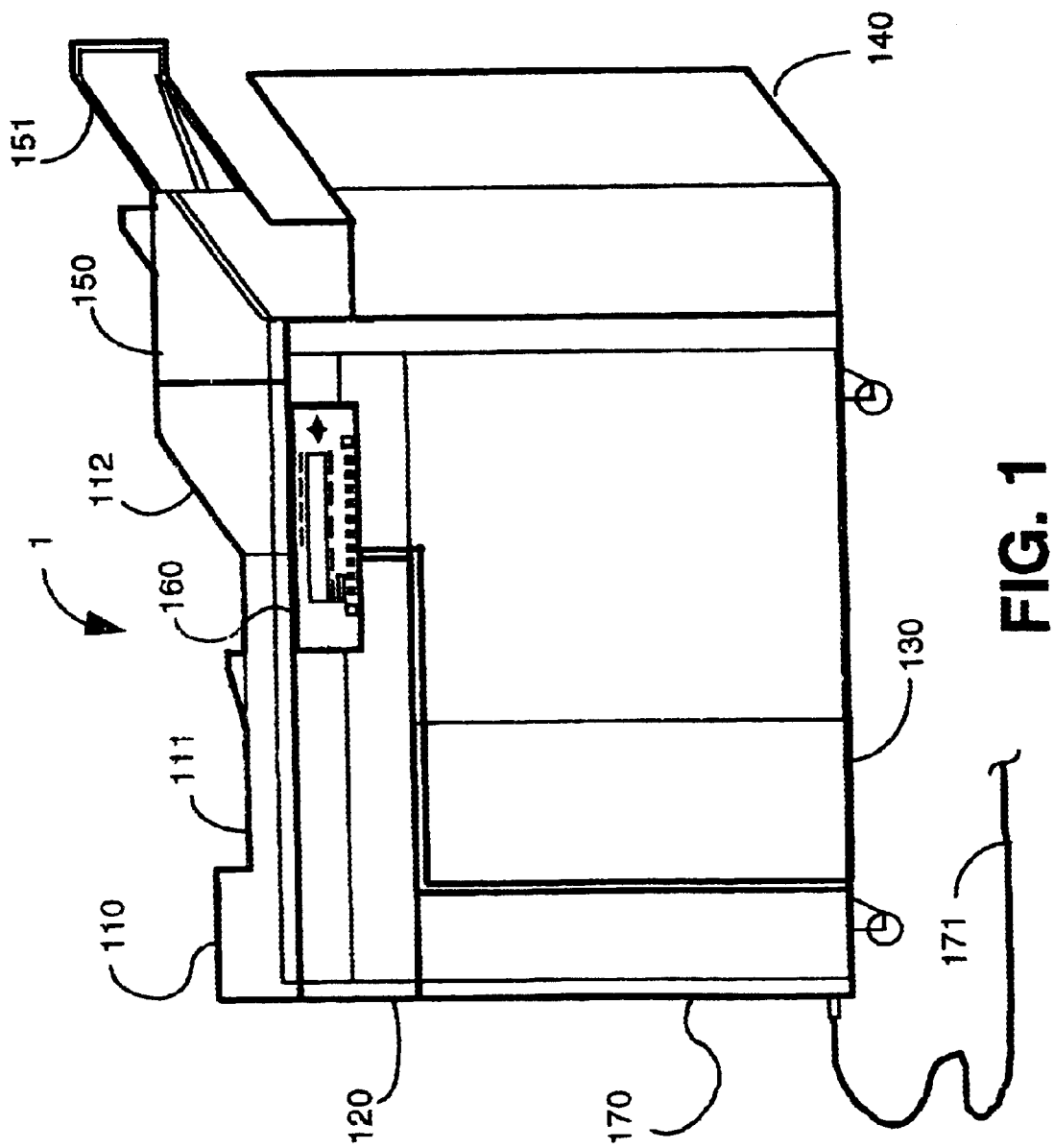
FIG. 1 illustrates the apparatus according to the invention.

FIG. 1 is a diagram of one example of the invention showing the apparatus according to the invention, on which the different parts are shown separately.

The document feeder 110 is provided with an input tray 111 for the introduction of a stack of documents, a transport mechanism (not shown) for transporting the documents one by one along the scanner unit 120, and a delivery tray 112, in which the documents are placed after scanning.

The scanner unit 120 includes a flat bed scanner provided with a glass platen on which an original document can be placed, a CCD array and an imaging unit having a movable mirror and lens system for imaging the document on the CCD array. The CCD array generates electrical signals which are converted into digital image data in a manner known per se.

The printer unit 130 includes an electro-photographic processing section known per se, in which a photoconductive medium is charged, exposed by means of an LED array in accordance with digital image data, and is developed with toner powder, whereafter the toner image is transferred and fixed on an image support, usually a sheet of paper.

A stock of image supports in different formats and orientations is available in the supply section 140.

The image supports with the toner image are transported to the finishing and delivery section 150, which if necessary collects them into sets and staples them and then deposits them in the delivery tray 151.

An operator control panel 160 is provided on the apparatus for operation thereof. It is provided with a display and keys and is connected to an operator control unit (not shown here).

The control electronics are shown diagrammatically by reference 170. A cable 171 connects this section of the apparatus to a local network 10 (not shown here).

Figure 2:
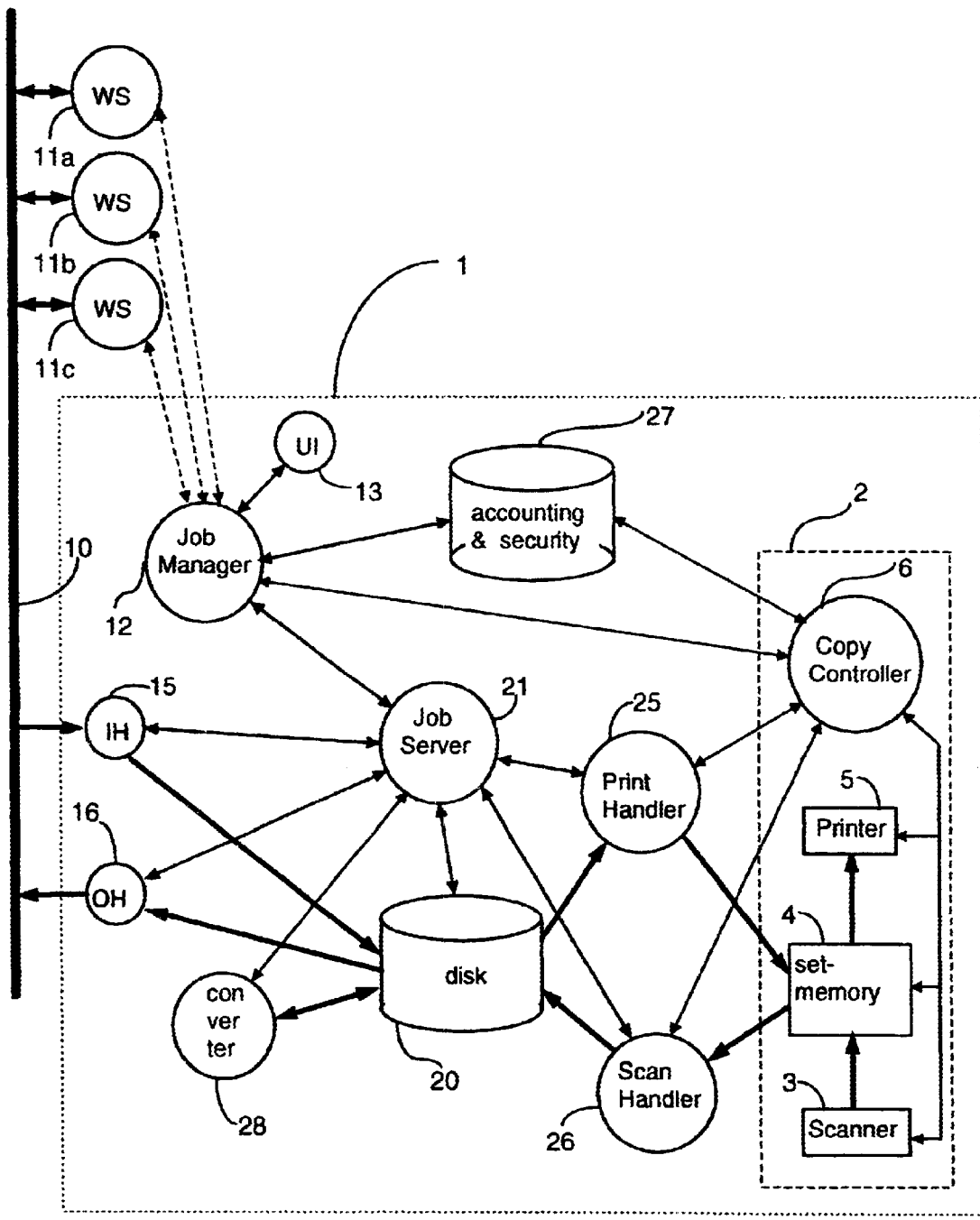
FIG. 2 is a diagram showing an example of the constituent parts of the apparatus according to the invention.

FIG. 2 is a diagram showing the constituent parts of the apparatus according to an embodiment of the invention.

The apparatus 1 includes a basic unit 2 which contains a scanner unit 3, a printer unit 5, a set memory 4 and a control unit 6 for these units, hereinafter termed the CopyController.

The basic unit 2 contains the units and functions required for making a simple copy. The scanner 3 during the scanning of an original document generates digital image data and stores them in the set memory 4, whereafter the printer 5 reads out the image data from the set memory 4 and prints them on an image support, usually a sheet of paper. This process is controlled by the CopyController 6. The set memory 4 in this description also includes an image processing function, although this is not essential to the present invention and is therefore not explained further.

The apparatus 1 also includes a number of units required to print digital image data which are fed via a local network 10 from a digital environment, and for exporting digital image data generated by the scanner 3 to the digital environment via the same local network 10.

The term "digital environment" as used here denotes one or more workstations 11a, 11b, 11c, on which a program is operative for communication with the apparatus according to the invention, and which are also connected to the local network 10.

The apparatus 1 is provided with:
- a management unit 12, hereinafter referred to as the: JobManager, which manages the processing processes and also updates an administration system for all the copying, scanning and print jobs present,
- an operator control unit 13, also termed a: UserInterface (UI), provided with an operator control panel on the apparatus housing, with a display and keys for operation of the apparatus 1,
- an InputHandler (IH) 15 for receiving and transmitting digital data reaching the apparatus via the network 10 from the digital environment and an OutputHandler (OH) 16 for sending digital data via the network 10 to the digital environment,
- a storage unit 20 formed by a high-capacity hard disk, and a unit 21 hereinafter referred to as a JobServer for managing the data files on the storage unit 20 and for controlling the processing processes,
- a control unit 25 hereinafter referred to as a PrintHandler, which is dedicated to providing a printing process, and a control unit 26 hereinafter referred to as a ScanHandler, which is dedicated to providing a scanning process,
- an accounting and security unit 27, which inter alia manages the authorisation of users and access codes,
- a conversion unit 28 for converting digital data files to different formats.

FIG. 2 shows control connections by means of thin arrows and data transport connections by means of thick arrows. The JobManager 12 is connected to the operator control unit 13, the JobServer 21, the CopyController 6, the accounting and security unit 27 and, via the network 10 and the InputHandler 15 and OutputHandler 16, to the workstations 11a–c. The latter connection is indicated diagrammatically by direct broken-line arrows. Apart from being connected to the JobManager 12, the JobServer 21 is also connected to the storage unit 20, the InputHandler 15, the OutputHandler 16, the PrintHandler 25, the ScanHandler 26 and the conversion unit 28. The CopyController 6 is connected to the scanner unit 3, the set memory 4 and the printer unit 5, and also to the JobManager 12, the PrintHandler 25, the ScanHandler 26 and the accounting and security unit 27.

Digital data files which are sent to the apparatus 1 via the network for printing are either of a first type or a second type. Files of the first type are required to be printed directly, i.e. without further action on the part of an operator at the apparatus, while files of the second type are required only to be stored in the memory of the apparatus and not to be printed until an operator explicitly so requests at the apparatus by selecting via the operator control panel. The type of file involved is apparent from an attribute added to the file.

Processing of a data file of the first type is referred to in this description as automatic printing (AP).

Processing of a data file of the second type is referred to as interactive printing (IP). The procedure with this is as follows (see FIG. 2).

A second type data file for printing sent by a workstation via the network is received by the InputHandler 15. The latter extracts from the file a number of predetermined identification data and passes such data to JobServer 21, which in turn transmits the data to JobManager 12. In this example, the extracted identification data includes the name of the owner and the name of the file itself. The file is then stored unchanged in the storage unit 20, whereafter the apparatus passes into the standby mode.

JobManager 12 manages an administration system in which the identification data of all the data files for printing stored in the storage unit 20 are entered. If a new file is supplied via the network, then the JobManager 12 adds the identification data thereof in connection with the name of the owner/sender to the administration system.

The storage unit 20 together with the administration system of the JobManager 12 form, as it were, a set of "logic storage spaces" for data files, each logic storage space being allocated to one user. Thus in actual fact storage in the user's logic storage space means that the file is stored in the storage unit 20 and entered in the administration system in connection with the name of that user. A logic storage space can be protected by a code specific to the owner/user, and in practice this means that an operator can only obtain information concerning the files stored in a specific logic storage space after he has input this code.

There can also be one or more logic storage spaces for general use which are not protected by a code, so that everyone has access to that logic storage space. All kinds of files used by numerous users, for example specific forms, can be stored in a public storage space of this kind.

The manager of the apparatus can set the JobManager 12 so that it does not accept any print jobs which are required to be printed immediately (files of the first type or AP). In that case, the JobManager automatically converts such jobs into interactive print jobs (IP) and stores the data file in storage unit 20 in the form of files of the second type.

When an operator wants to have a specific data file of the second type printed, he must give a command for this by means of the apparatus operator control panel 160. In response to this, the data file is brought out of the storage unit 20 and converted to printable data by the PrintHandler 25, and after intermediate storage in the set memory 4 the data are processed by the printer unit 5 to give a print. A print file of the second type can be protected by means of a code by the sender. This code has the form of an attribute to the print file. If a user wants to print this file interactively, he must input the security code on the operator control panel before the file is printed.

When a data file of the second type has been printed, it remains in principle stored in the storage unit 20 until it is removed by the user himself or the manager of the apparatus. To this end, he gives a command for removal of a selected file. In response to this the JobManager 12 passes a command to the JobServer 21 to erase the intended file from the storage unit 20 and it removes the identification data of that file from its administration system.

Figure 3:
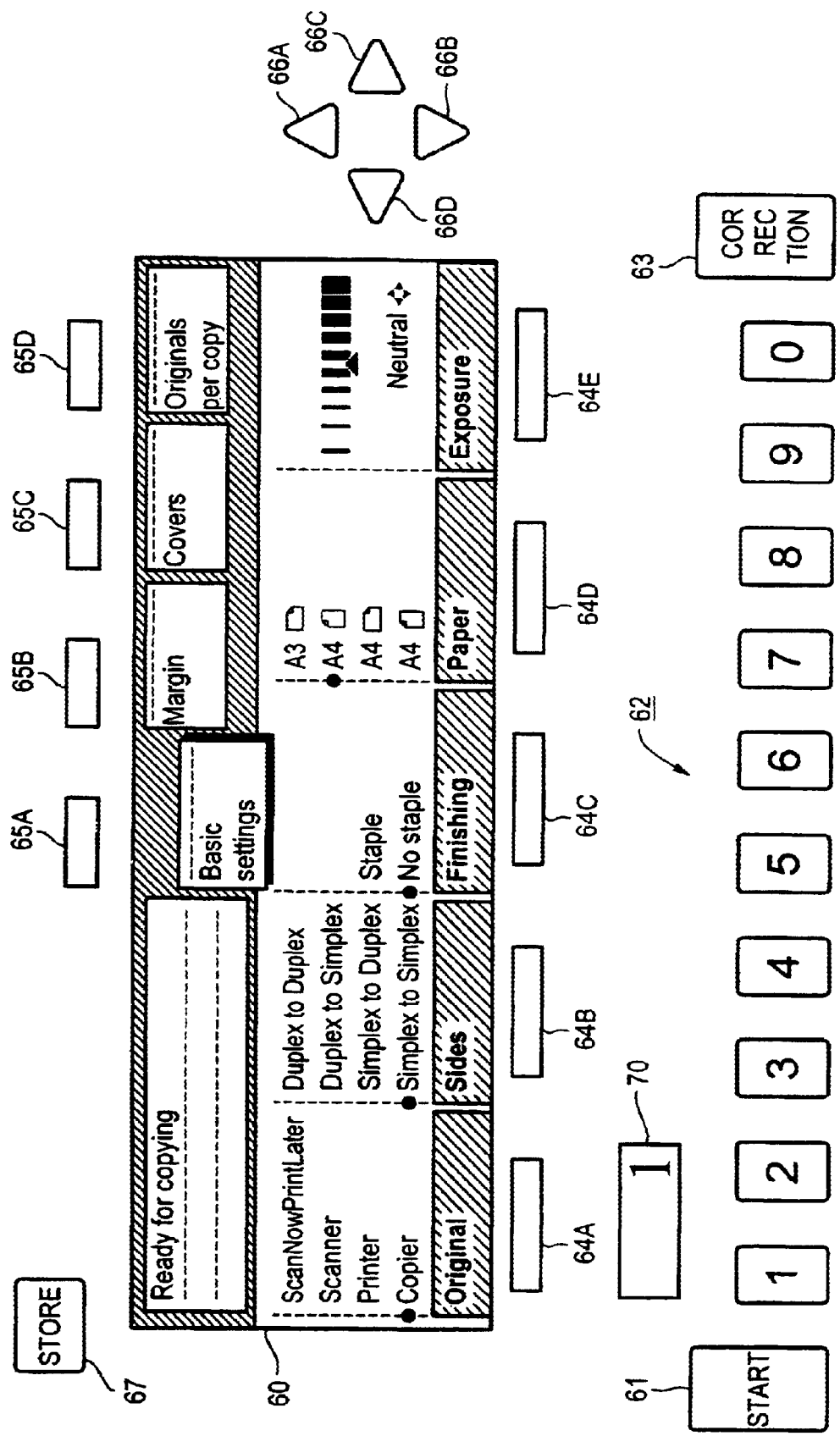
FIGS. 3 and 4 illustrate examples of the apparatus operator control panel in various situations.

An example of the operator control panel 160 belonging to the operator control unit 13 is shown in FIG. 3 and includes a display screen 60, such as an LCD display, and a number of keys, namely a start key 61, number keys 62, correction key 63, storage key 67 and selection keys 64A–E, 65A–D and the key cluster 66A–D. All these elements are connected to the operator control unit 13, which in response to operation of the keys passes signals to the JobManager 12 and which also controls the display screen 60 to display options and messages to the operator.

When the apparatus has been switched on, the display screen 60 displays an image formed by a number of vertical columns, each situated above one of the selection keys 64A–E. Each column relates to a specific basic function of the apparatus and shows the different possible settings for that basic function. For example, the furthest left column is allocated to the choice between a copying function, in which a document is scanned by the scanner and then reproduced, a printer function for interactive printing, in which a print is made using a data file of the above-mentioned second type sent using the network for printing, a scanner function, in which a document is scanned while generating a scan file that can then be fetched by a workstation, and a deferred copying function ("scan now-print later"), in which a document is scanned while generating a print file of the second type which is stored in the storage unit of the apparatus and can be printed with the printer function. The setting selected at any time, the copying function in this case, is indicated by a marker, such as a dark dot, or by highlighting.

By actuating a selection key an operator can choose a different setting, e.g. in accordance with a cyclic pattern. As a result of a change of a setting the function of one or more of the other selection keys may change, because the old function is no longer relevant and other selection options are required. Different text relating to the new function then appears in the associated column of the display screen 60.

The selection keys 65A–D offer the possibility of bringing up a different set of functions which cannot be displayed by the restricted dimensions of the display screen 60. These are generally functions which are not required for a simple copying or print job, but which offer the operator more options to obtain special printing results. In this example, these functions comprise shifting the margin on the print, adding covers, and multiple up. The meaning of the keys 65A–D is indicated in an associated field in the display screen 60 directly beneath each key. When one of the keys is actuated the corresponding set of functions is activated and the layout of the display screen 60 is adapted to the associated functions. At the same time, this selection is displayed by framing or otherwise making conspicuous that field on the display screen 60 which belongs to the actuated key of the group 65A–D.

The operator control panel 19 also contains a number display 70 to indicate the number of prints set, as is generally customary on copying machines.

If the printer function has been selected by key 64A in the "basic settings" group, the columns above the keys 64B (simplex or duplex, both in respect of the original document and the copy sheet), 64C (stapling) and 64D (the choice of format of the print paper) relate to the finishing of the copying job and the column above key 64E relates to light/dark control for the copy.

Figure 4:
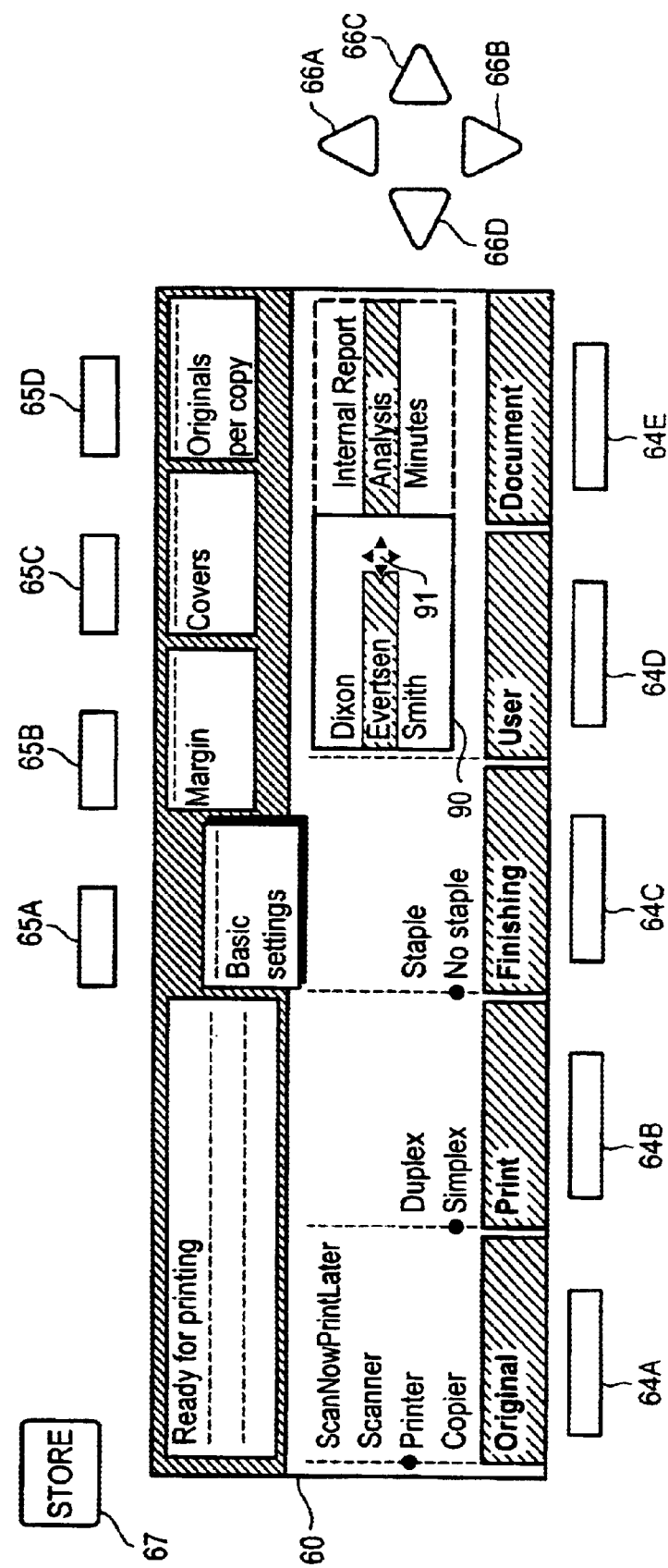

FIG. 4 shows an example of the layout of the display screen 60 after the printer function for interactive printing of data files of the second type has been selected by key 64A in the group "basic settings". In this case the keys 64D and 64E now have the function of specifying the data file for printing by selection of users and file name. Different files of the second type, from different users, may in fact be stored in the memory. All these files are entered in the administration system of the JobManager 12, as described above, and can be displayed on the display screen 60 for selection.

After actuation of key 64D, an operator can select a user name from the list of users who have sent one or more files, and after actuation of key 64E a file name can be selected from the list of files sent by the selected user.

In response to the actuation of key 64D the column on the display screen above this key is provided with a frame 90 and a star symbol 91 to show that a user name can be selected and the star keys 66A–D are active for that selection. As a preselection, the name of the user who last sent a file to the machine is automatically selected as the name.

The pair of keys 66A/B is used to proceed alphabetically through all the user names in the list, forwards with key 66A and backwards with key 66B. If there are more names than can be displayed simultaneously in the frame 90, then as many names as fit within the frame are displayed and the whole list is automatically scrolled through. A bar having text therein in reverse video indicates what name has been selected.

In response to actuation of key 64E, the column of the display screen above that key is provided with a frame and a star symbol in exactly the same way as the procedure on actuation of key 64D as described above, in order to indicate that a file name can be selected and that the star keys 66A–D are active for that selection. The selection with the star keys is exactly the same as to that involved in the selection of a user name. The last file sent is selected, for example, as a preselection.

After selection of a file, the printing process is started by actuating the start key 61.

The operation of the accounting and security unit 27 will now be explained by reference to FIG. 5A and FIG. 5B. This unit both controls access to the copying, scanning and printing, and the accounting for copies, scans and prints made. It has available a database in which an entry can be made for each user by the apparatus manager. For a user, a user code (hereinafter alternatively referred to as the "PIN" code or personal identification number code) is stored at his user name and a total to which is added the copies and prints made. Each user name also has an authorisation code stored to determine the authorisation of the relevant user to make use of the apparatus. This can be set up by the apparatus manager, so that access can, for example, be occasionally denied. The authorisation can also be automatically denied to a specific user if, for example, a predetermined credit has been used up.

FIG. 5A describes the case in which a user makes a copy or print at the apparatus. In that case he must first input his user code by means of the number keys on the operator control panel (5-1). If the code is correct (5-2), the accounting and security unit 27 checks the authorisation (5-3). And if this is also in order then the relevant user may make his copies, scans or prints (54) and these are added to the user's total usage. If either the user code is incorrect or the user is not authorised, then the unit 27 refuses to release the apparatus for use and reports this on the display on the operator control panel (5-5).

FIG. 5B describes the case in which a user sends a digital data file from his workstation to the apparatus for immediate printing. The task of the accounting and security unit 27 then includes firstly in checking whether the user name, which always forms part of the data file, occurs in the database (5-11).

If the database does not contain the user's name for a received print file, then the accounting and security unit 27 makes a new entry in the database (5-15) for this user's name, with an automatic authorisation. The mode in which the accounting and security unit 27 does this is hereinafter referred to as the "dynamic mode". It may be that the accounting and security unit 27 has been brought into a different mode, hereinafter referred to as the "static mode", by the apparatus manager, in which case the user's name is not added to the database and the print job is automatically not carried out (5-16). This first treatment is indicated in FIG. 5B in a block I having a broken-line frame.

If the check in block I has a positive result, then the authorisation is checked (5-12) and if it is also in order then the print file is processed further (5-13), the prints being added to the user's total usage.

The access system of the accounting and security unit 27 can also be switched off so that anyone can without difficulty copy, scan and, from a workstation, print. In relation to a print job from the operating control panel on the apparatus, the access system remains partially active, namely for protecting individual print files, as will be described hereinafter.

Copying

Figure 6:
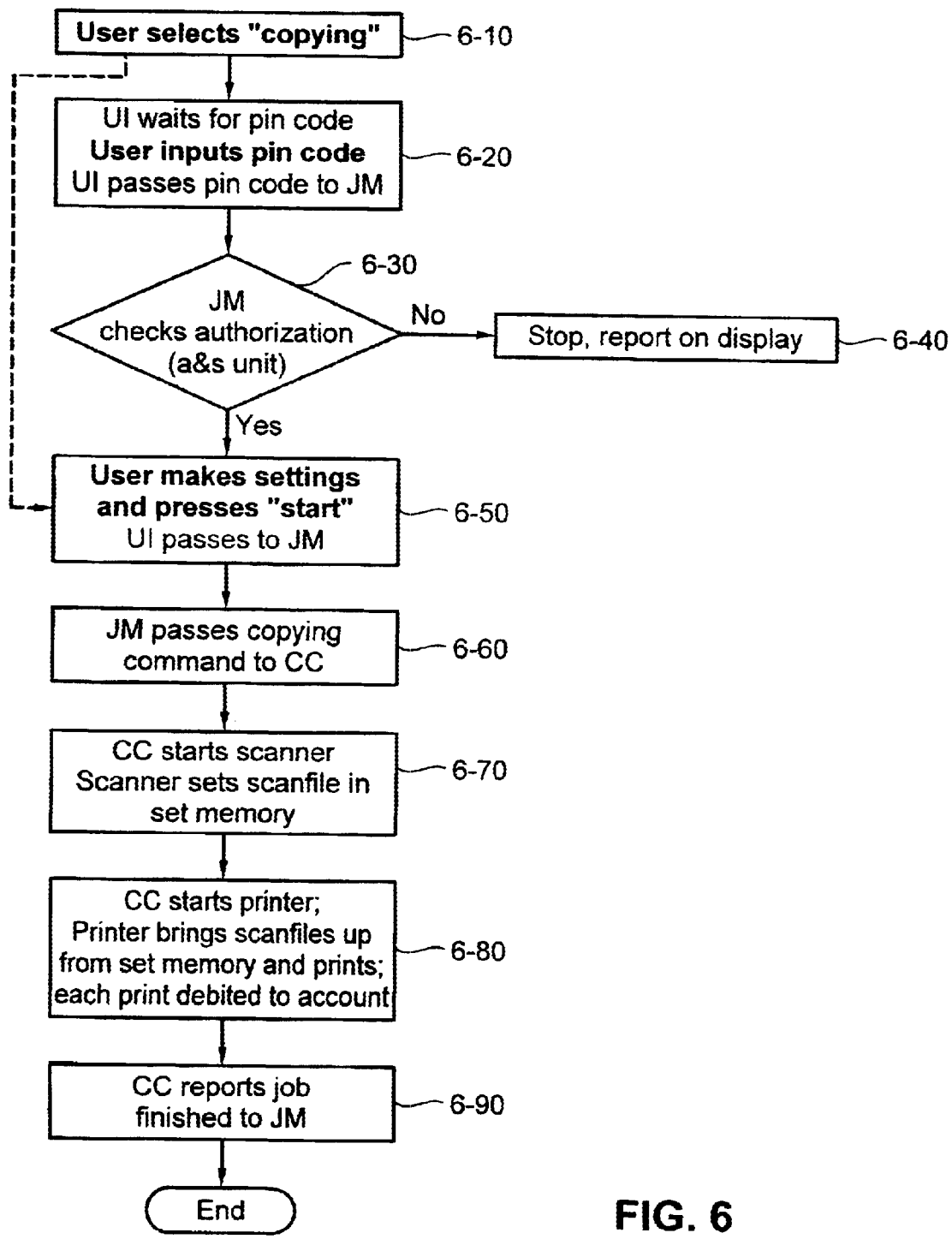
FIG. 6 is a flow diagram of a process for making a copy according to an embodiment of the invention.

FIG. 6 shows the procedure for making a copy. It is assumed in this case that the access system of the accounting and security unit 27 is switched on.

At the start of the process (6-10), the apparatus is in the "copying" mode or the operator selects that mode by means of key 64A on the operator control panel 160. The operator control unit 13 now waits for a user code and when the operator inputs this passes it through to the JobManager 12 (620). By using the accounting and security unit 27 the JobManager 12 checks the authorisation of the relevant user (6-30). If this is not in order, then the JobManager refuses to make a copy and reports this on the display on the operator control panel 160 (640).

If the authorisation is in order, then the operator can start copying, by making settings for the process on the operator control panel, placing documents in the input tray 111 of the document feeder 110 and actuating the start key 61 (6-50). The settings and the start command are then transmitted by the operator control unit 13 to the JobManager 12.

If the access system of the accounting and security unit 27 was switched off, then step 6-50 immediately follows step 6-10.

The JobManager 12 then gives a command to the CopyController 6 to activate the various parts of the apparatus (6-60). On the command of the CopyController 6 the scanner unit 3, including the document feeder 110, is now started to scan documents one by one and pass the digital data thus generated to the set memory 4, and the printer unit 5 is started to read the digital data out of the set memory 4 and print them on sheets of paper (6-70 and 6-80).

When all the documents have been scanned and printed, the CopyController 6 reports the job finished to the JobManager 12 (6-90) and the copying action is completed.

Reception of a Print File

Figure 7:
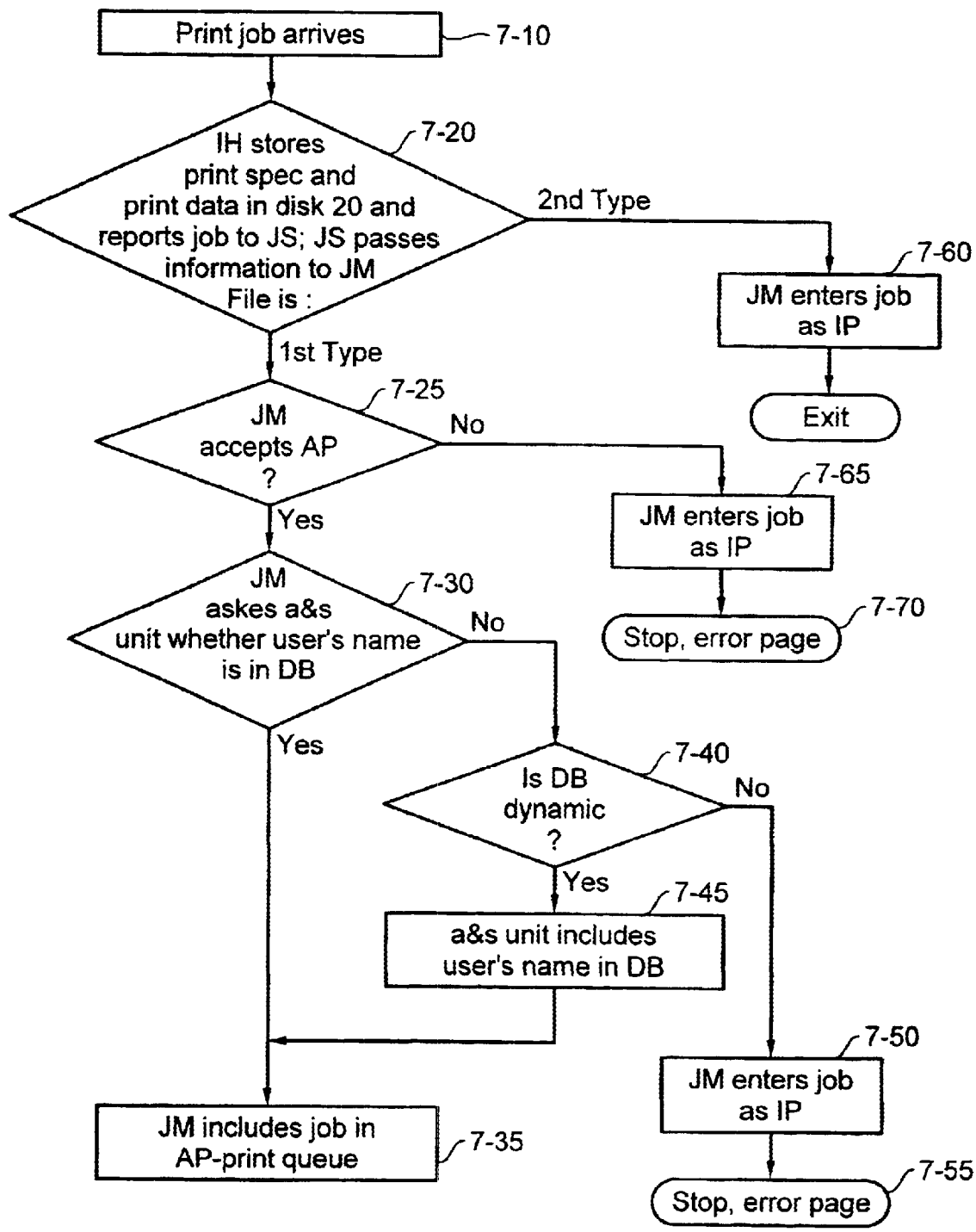
FIG. 7 is a flow diagram of a reception process for print files according to an embodiment of the invention.

FIG. 7 is a description of the procedure on the arrival, via the network, of a data file of the first or second type for printing according to an embodiment of the invention.

The relevant data file is received by InputHandler 15 (7-10). This extracts identification data (including the name of the user and of the file) and print specifications (e.g. printing and finishing parameters), determines whether it is a print file of the first (AP) or of the second (IP) type, reports the job to the JobServer 21 and stores the entire file, i.e. the print specifications and the image data for printing, in the storage unit 20 (7-20). The JobServer 21 in turn reports the job, with the relevant data, to the JobManager 12.

If the print file is of the second type, the JobManager enters the job as such in its job administration system (7-60), whereafter no further activities take place in respect of this job.

If the print file is of the first type, the further handling (7-25) thereof depends on whether the JobManager 12 is in the mode in which it accepts automatic print jobs (AP). If not, the JobManager enters the print job in its job administration system as being an interactive print job IP and does not pass to direct printing (7-65). A message can be printed out, however, giving the reasons why the job has not been carried out (7-70).

If the JobManager 12 is in the mode in which it does accept automatic print jobs, it calls in the accounting and security unit 27 to determine whether the job can be processed (7-30). The accounting and security unit 27 proceeds as described in connection with block I in FIG. 5B. If this check (7-40) shows that the file may not be printed, then the JobManager enters the print job (750) in its job administration system as being an interactive print job (IP) and does not pass to direct printing. A message can be printed out on a sheet of paper, however, giving the reasons why the job has not been carried out (7-55). If the check (7-40), however, shows that the file may be printed, then the accounting and security unit 27 makes a new entry in the database (7-45) for the user's name and the process proceeds to 7-35 step.

If the check by the accounting and security unit 27 proves positive, the JobManager includes the job in the print queue (7-35) for automatic print jobs (AP-queue), where it has to wait its turn for processing.

Interactive Printing

Figure 8:
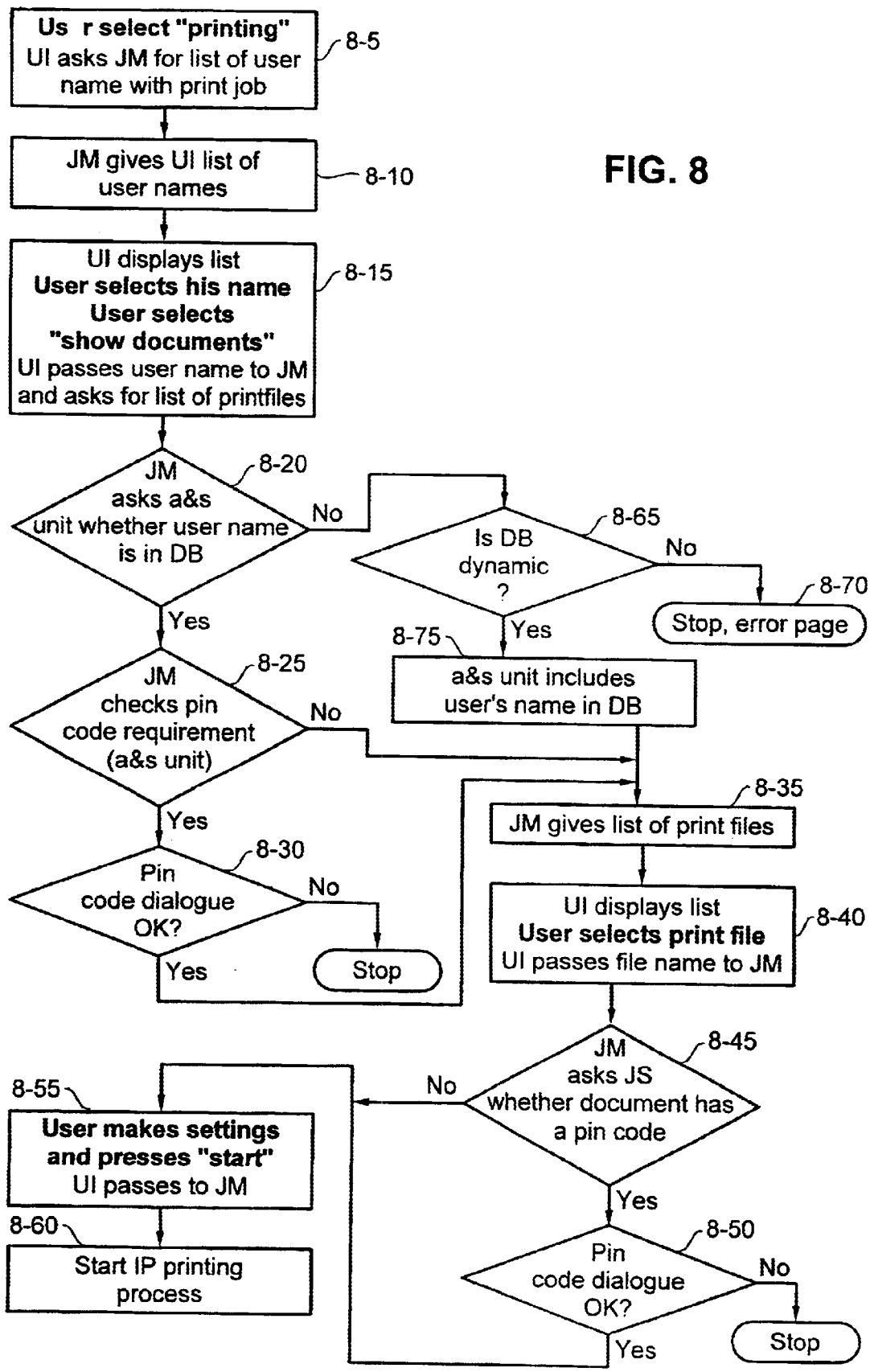
FIG. 8 is a flow diagram of the initial procedure of an interactive printing process according to an embodiment of the invention.

FIG. 8 shows the course of events when a user gives an interactive print order with the aid of the operator control unit 13 on the apparatus operator control panel 13.

The user will start by selecting the print function (8-5) with key 64A (FIG. 3/4). The operator control unit 13 then passes a request to the JobManager 12 to pass a list of all the users who have sent a print job of the second type that has not yet been processed. In response to that request, the JobManager makes up a current list and passes it to the operator control unit 13 (8-10).

The operator control unit 13 displays this list on the display, in the column above key 64D (FIG. 4), whereafter the user can select his name. After the user has done this, he actuates key 64E to obtain an overview of his own print jobs. In response to this, the operator control unit 13 gives the selected user's name and a request for a list of print jobs of that user to the JobManager (8-15).

The JobManager now asks (8-20) the accounting and security unit 27 whether the relevant user's name occurs in its database. The unit 27 then proceeds as described in connection with block I in FIG. 5B. If the name really does occur in the database, the JobManager asks the accounting and security unit 27 whether there is a user's code for this user's name (8-25), and, if so, it conducts a dialogue with the user through the agency of the operator control unit 13 in order to check the user's code (8-30). If the result is positive, the JobManager makes up a current list of interactive print jobs (8-35) of the relevant user and passes it through to the operator control unit 13, which submits this list to the user for selection on display 60. If the name does not occur in the database (8-20), it is determined if the database is in the dynamic mode (8-65). If it is, the accounting and security unit 27 includes the user's name in the database (8-75); but if it is not, the print job does not pass to direct printing and an error message indicating the status of the print job is provided (8-70).

The user now selects a print file (8-40) the name of which is transmitted by the operator control unit 13 to the Job-Manager 12, which in turn asks (8-45) the JobServer 21 whether a security code was sent with the selected file. If so, then through the agency of the operator control unit the JobManager again carries out a dialogue (8-50) with the user to check the code. If the result is positive, the JobManager releases the file for printing, and the user can set finishing parameters on the operator control panel (8-55), whereafter the user can start the printing process (8-60) by actuating the start key 61.

If a user has sent a number of print files each provided with a security code and then wants them all printed interactively, then after a first print file the JobManager in the case of a subsequent print file tries out whether the security code of the preceding protected file is also valid for the current file and will start a new check dialogue with the user only when the current file has a different security code. In this way a user can work faster if he gives a series of print files the same security code. For printing he then only needs to input the code the first time. The use of a single security code is also convenient because the user does not then have to remember a number of different codes.

This procedure is explained by the following example. Let us assume that a user has sent the following series of print files to the apparatus for interactive printing:

File 1, security code 123
File 2, security code 123
File 3, no security code
File 4, security code 123
File 5, security code 456
File 6, security code 456
File 6, security code 123

If the user now selects the files consecutively for printing at the apparatus, he must input the code 123 at file 1, whereafter the JobManager releases the document for printing. File 2 is automatically released because the code of file 1 is also valid for this. File 3 has no security code and is therefore printed without checking. File 4 has the same security code as the preceding protected file, and is therefore automatically released also. File 5 has a different security code, and here the user must again input a code, whereafter file 6 is automatically released. Finally, another code has to be input for file 7, because although this security code was used previously, it is not the code of the preceding protected file.

Printing Process

Figure 9:
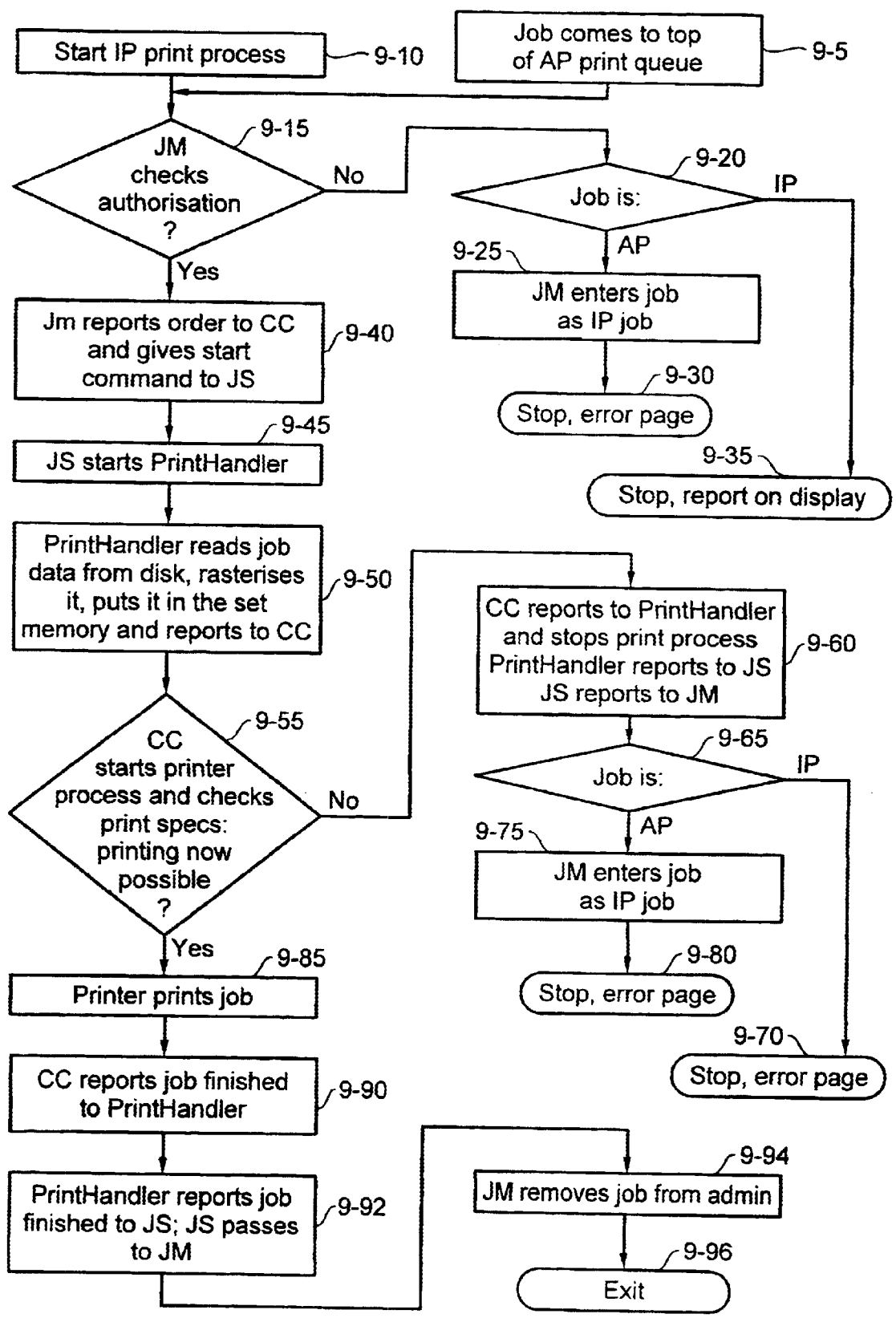
FIG. 9 is a flow diagram of a printing process according to an embodiment of the invention.

FIG. 9 shows the progress of the printing process started either by the JobManager 12 when a print job of the first type (AP) reaches the head of the AP queue (9-5), or by the user as an interactive print job (IP) (9-10). It should be noted here that the JobManager is so programmed as to be able to start an automatic print job only if no activity has been observed on the operator control panel for a predetermined time, e.g. 30 seconds. This prevents a user occupied in a job at the operator control panel from being disturbed by the sudden start of an automatic print job.

If the access system of the accounting and security unit 27 is switched on, the JobManager now first checks the authorisation (9-15) of the relevant user (the owner of the print job). If the authorisation is not in order, the process is interrupted (9-20). If the print job is an automatic print job, the JobManager records the print file as being of the second type (9-25) and does not print it (9-30). It is possible to make a print giving the reasons why the job has not been carried out. In the case of an interactive print job, the JobManager refuses the order and displays (9-35) a report thereof on the display at the operator control unit 13.

If the user is authorised, the JobManager reports the print job to the CopyController 6 and gives a start command (9-40) for this order to the JobServer, which in turn starts up (9-45) the PrintHandler 25, so that the latter reads the relevant print file from the storage unit 20, rasterises it, and stores it (9-50) in the set memory 4. On a report from the PrintHandler to the CopyController 6 to the effect that sufficient image data are stored in the set memory, the CopyController starts (9-55) the printer unit 5 to make a print.

In this connection (9-55) the CopyController first checks whether the print specifications belonging to the print job have been satisfied, for example if there is a stock of the required type of image supports (format, orientation, colour). If these specifications have not been met, then the job is stopped. The CopyController reports (9-60) this to the PrintHandler, which passes the report through to the JobServer, the latter in turn passes (965) it to the JobManager, and the latter reports (9-70), in the case of an interactive print job, the impossibility for printing to be carried out, to the user by a message on the display of the operator control unit 13 or, in the case of an automatic print job, alters (9-75) the description of the job in its administration system to an interactive print job, so that a user can consequently still start the job from the operator control panel at a later moment. Once again a print can be made (9-80) showing the reasons why the job has not been carried out.

If the print job can be processed, the printer unit 5 reads the image data out of the set memory 4, prints them (9-85), and reports (9-90) this to the CopyController 6. When the complete print job has been carried out, the CopyController reports (9-92) this to the PrintHandler 25, which passes this to the JobServer 21, and the latter in turn to the JobManager 12, which then removes (9-94) the job from its administration system, thus completing (9-96) the printing process.

Scanning

Figure 10:
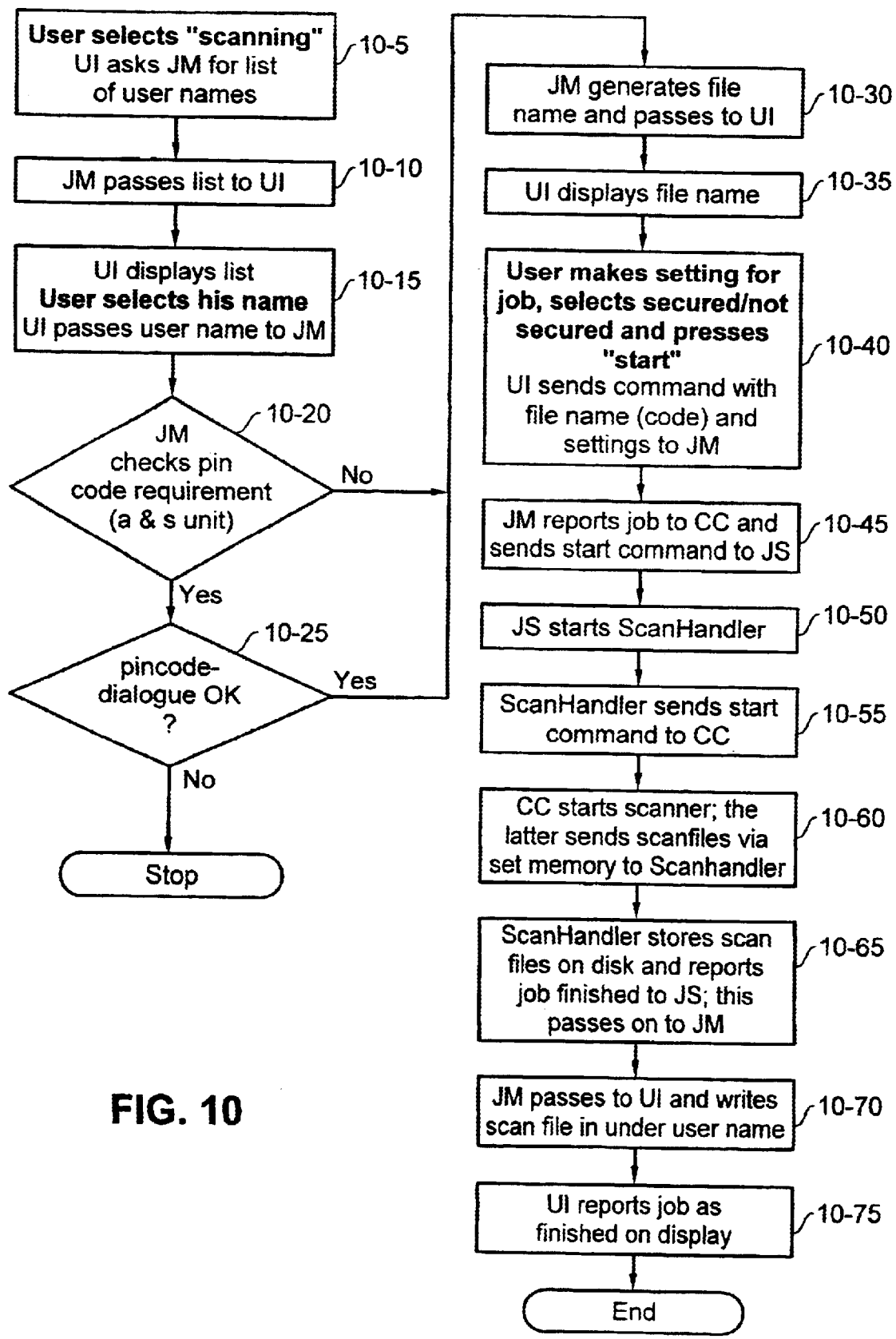
FIG. 10 is a flow diagram of a scan process according to an embodiment of the invention.

FIG. 10 shows the procedure when a user wishes to have a document scanned by the apparatus in order that the digital data generated in these conditions, hereinafter referred to as the scan file, may be further used for processing or storage at his workstation. The scan file in this case is not transmitted to a predetermined address over the network immediately after generation as is usually the case, but is stored in the storage unit 20 of the apparatus, whereafter it must be called up from a workstation. The procedure with this is as follows.

Using the key 64A on the operator control panel of the operator control unit 13 the user selects (10-5) the "scanner" option. In response to this the operator control unit asks (10-5) the JobManager 12 for a list of all the names of users known to the JobManager, i.e.: all the user names in the database of the accounting and security unit 27. As already stated previously, these user names can be entered in the database by the apparatus manager or be automatically added by the accounting and security unit 27 on receipt of a print order from a workstation. Also, when a program intended for communication with the apparatus is started at a workstation this program can automatically be reported to the apparatus JobManager which then ensures that an entry for the user of the workstation is made in the database.

In an alternative embodiment, the user names in the database are provided with an attribute which indicates whether they are authorised to make use of the scan function. In that case the list contains only the names of the authorised users.

Figure 11:
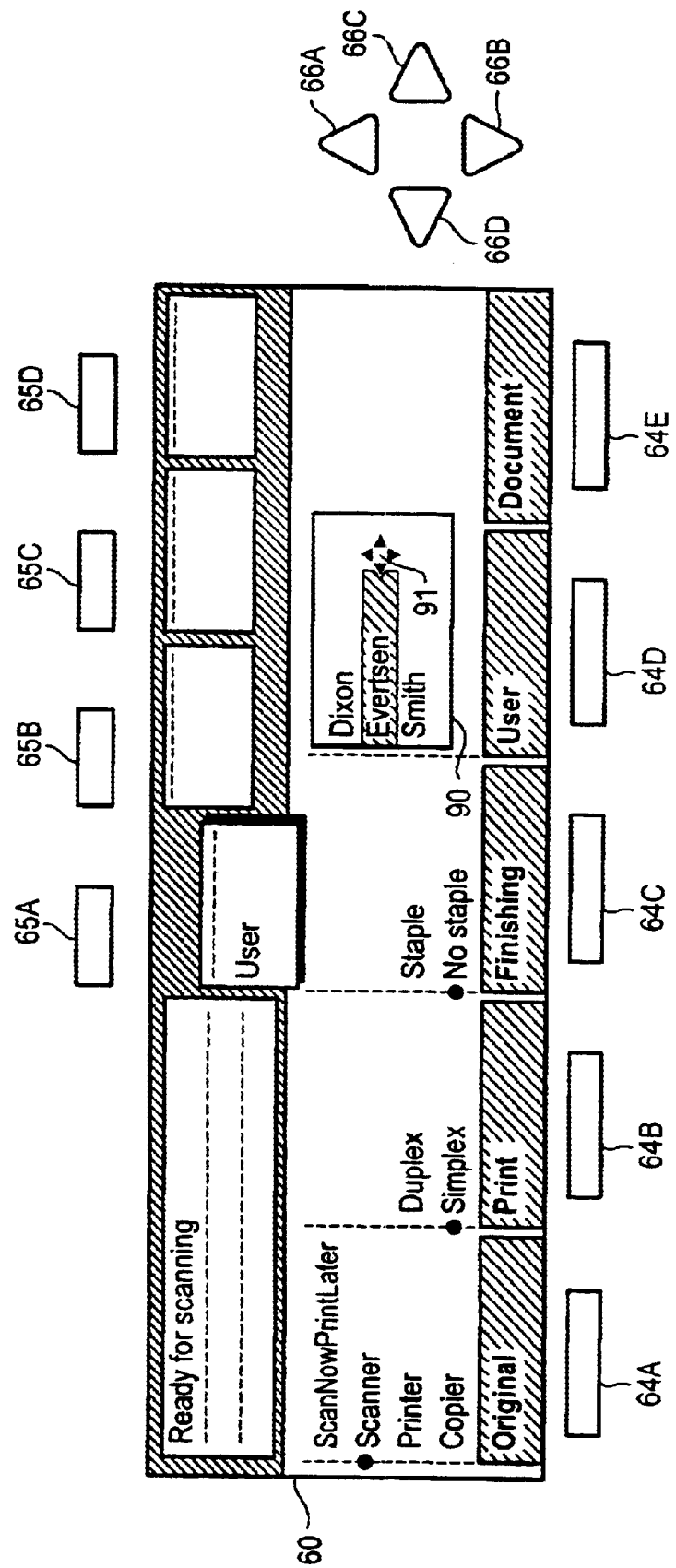
FIG. 11 illustrates an example of the operator control panel.

The JobManager passes (10-10) the list of the user names through to the operator control unit 13, which displays (10-15) this on the display 60 for selection by the operator. This is shown in FIG. 11, which illustrates the display 60 after selection of the scanner function.

After the user has selected his name, the operator control unit passes this through to the JobManager 12, which by means of the accounting and security unit 27 then checks (10-20) whether a user code is necessary to obtain access to the scanner function. If that is the case, then by means of the operator control unit 13 it conducts a dialogue (10-25) with the user in order to check his code. In the case of a positive result (10-30), the JobManager releases the scanner function and automatically generates a name for the data file to be made during scanning, and this is passed to the operator control unit 13, which in turn displays (10-35) this file name on the display 60, so that the user subsequently knows the name by which he can find the scan file. This automatically generated name can, for example, have the form:

YYYYMMDDhhmmssxxx, which successively shows the year, month, date, hour, minute and second of the scan action, and the serial number of the document in the scanned set.

In addition, the operator control unit now displays in a form similar to the form for selection (10-40) of settings for a copying or printing process (cf. FIGS. 3 and 4), a possible choice for parameters of the scan process, such as the resolution, the format (e.g. TIFF, BMP, etc.), the magnification factor, and whether the original document is to be scanned on one side or both sides. The user can select his settings from this or he can leave the preselected values as they are. The user then places his original documents in the input tray 111 of the document feeder 110 and actuates the start key 61. In response to this the operator control unit 13 transmits a start command with all the data to the JobManager 12.

The JobManager now reports (10-45) the job to the CopyController 6 and sends a start command to the JobServer 21, which in turns starts (10-50) the ScanHandler 26. The latter transmits (10-55) a start command to the CopyController 6, which controls the scanner unit 3 in order to transport the original documents one by one to the scanner, scan them, and generate scan files. In these conditions the scanner unit counts the number of original pages scanned. The scan files are stored in the set memory 4 and then transmitted (10-60) to the ScanHandler, which stores (10-65) them in the storage unit 20. In addition, the image processing function of the set memory also makes a file with a reduced image of the scanned image, known as a "thumbnail", and this is also stored in the storage unit 20. Thumbnails of this kind are used later for identification in the selection of a scan file.

When all the documents have been scanned, the ScanHandler 26 reports the job as finished to the JobServer, which in turn transmits (10-70) this to the JobManager. The latter passes the finished report (10-75) to the operator control unit 13, which displays it on the display 60 of the operator control panel, together with the number of pages scanned, so that the user can check whether any documents have been skipped. That concludes the scan job.

Scanning with Scan Profile

In a specific embodiment of the apparatus according to the invention, a user can also keep for other scan jobs, settings of scan parameters hereinafter referred to jointly as the scan profile. These parameters are then stored in the storage unit under the user's name in the administration system of the JobManager 12. A scan profile can be brought up later, so that scan jobs can be programmed more quickly. This is described in FIG. 12. The scan profile can also contain an individual name for the scan file made, this name being respected by the JobManager 12 and being used instead of the automatically generated file name, or be combined therewith. This facilitates identification of the file by a user.

Figure 12:
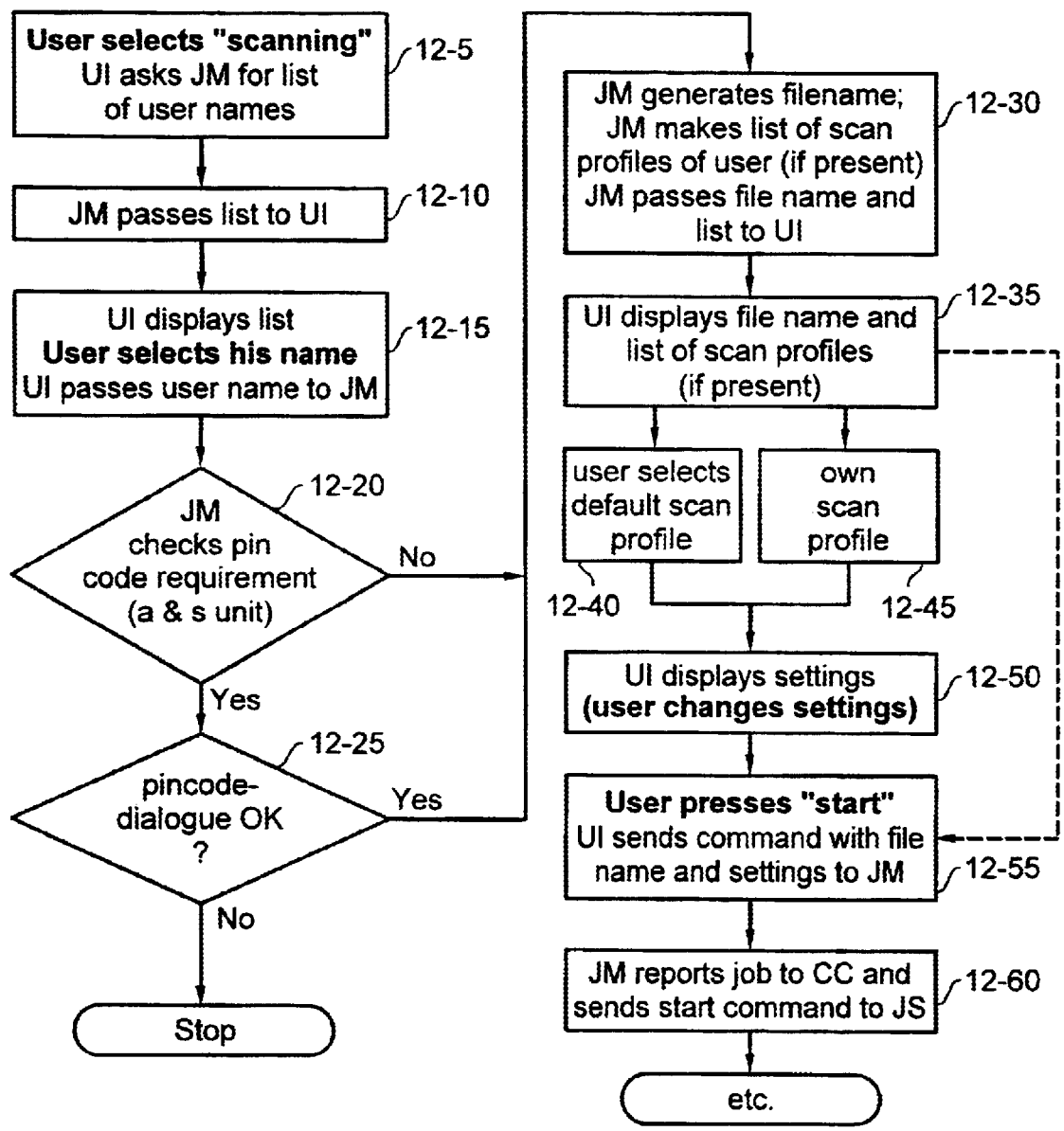
FIG. 12 is a flow diagram of a scan process using a scan profile according to an embodiment of the invention.

FIG. 12 shows the procedure in carrying out a scan job using a scan profile. This differs only in a limited number of points from the procedure described above with reference to FIG. 10. After the JobManager 12 by means of the accounting and security unit 27 has established the fact that a user is authorised (12-5→12-25) to make use of the scanner function and has generated a file name for the job that has just started, it also checks in its administration system whether scan profiles are stored under the name of this user. If so, it makes a list thereof and passes (12-30) it, together with the generated file name, to the operator control unit 13, which displays(12-35) both on the display. Apart from a default profile, one or more profiles for general use can also be added to this list, stored in a public set in the storage unit 20. The reproduction of scan profiles has the same form as that of files for printing in FIG. 4. The default settings have been selected as a preference. The user can now select (12-40, 12-45) a profile from the displayed list. The selection should be confirmed by actuating the key beneath the selection column, whereafter the operator control unit 13 displays the settings of the selected profile on the display. Starting from the settings which are then applicable the user can then change (12-50) one or more thereof. If he then actuates (12-55) the start key 61 (or if he actuates the start key without selecting a different profile from the preselected default profile), the operator control unit 13 transmits (12-60) a start command with the applicable settings to the JobManager 12, and the remainder of the procedure is as described with reference to FIG. 10.

Making and Storing the Scan Profile

Figure 13:
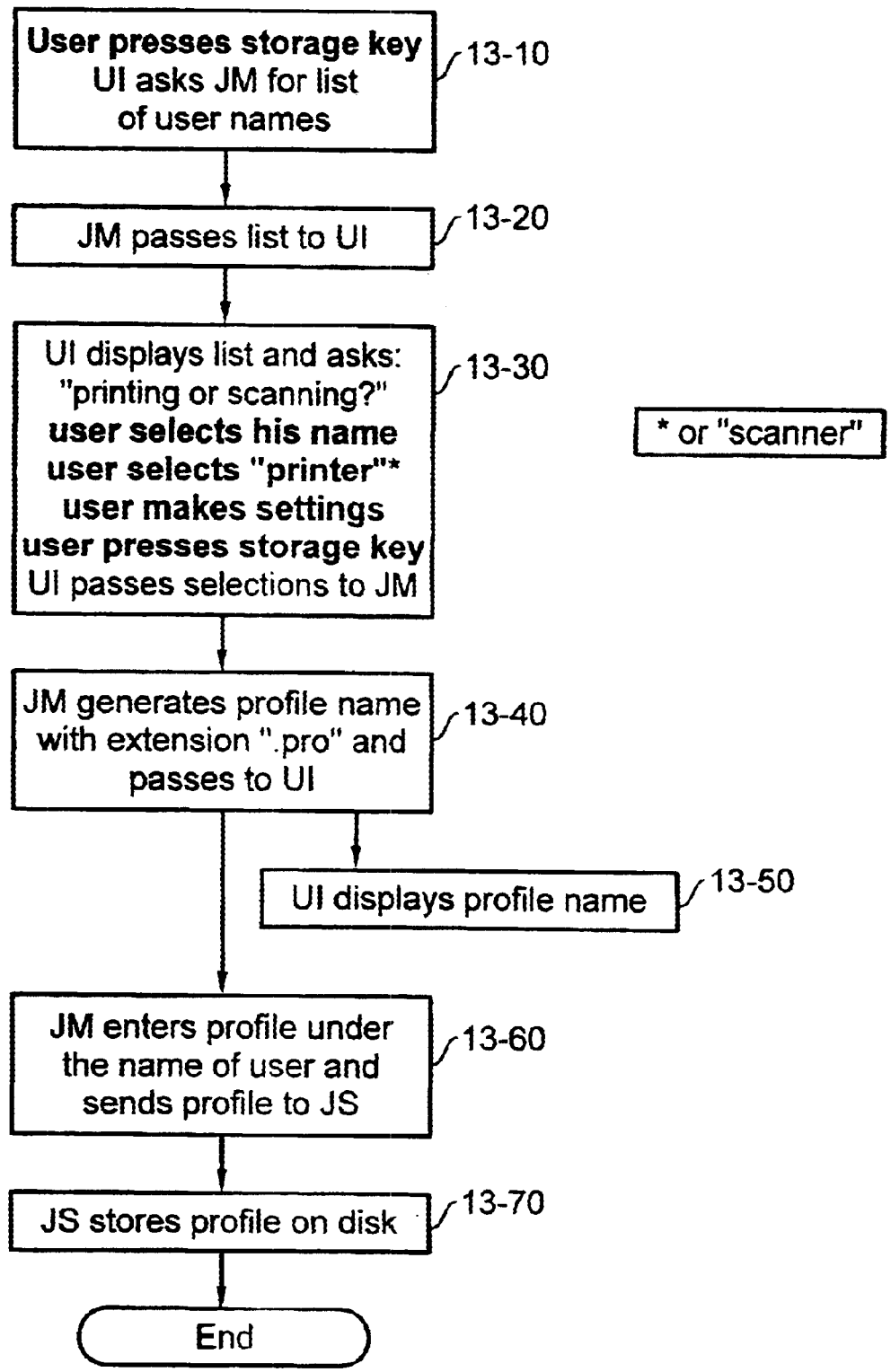
FIGS. 13 and 14 are flow diagrams of a procedure for making a scan profile according to an embodiment of the invention.

FIG. 13 shows the procedure for making and storing a scan profile from the apparatus operator control panel. The storage key 67 is used for this.

In response to actuation (13-10) of the storage key 67, the operator control unit 13 asks the JobManager 12 for a list of all the user names it knows, i.e., all the user names in the database of the accounting and security unit 27.

The JobManager passes (13-20) the list of user names to the operator control unit 13, which displays (13-30) it on the display 60 for selection by the operator. The operator control unit 13 also asks the operator, by a message in the message window on the top left of the display 60, whether the operator wants to make a scan or a print profile. The operator must respond to this by selecting the required function in the left-hand column above key 64A, i.e. in this case "scanner". On this latter selection the selection screen of the chosen function is displayed on the display and the operator can make his settings. If required, he can also use the other sets of parameters, which can be called up with the keys 65A–D.

The operator then again actuates storage key 67 and in response to this the operator control unit 13 sends the user name, function and chosen settings to the JobManager 12, which automatically generates (13-40) a name for the profile, enters (13-60) the profile under that name in its administration system in connection with the user's name and passes the received profile together with the profile name to the JobServer 21 for storage (13-70) in the storage unit 20.

The JobManager 12 then sends the generated profile name to the operator control unit 13, which displays (13-50) it on the display 60, where it subsequently disappears either by the start of a new operation or after expiry of a predetermined interval of time.

The automatically generated file name always has the extension ".pro" and if required can be replaced by a "rename" mechanism from the user's workstation by another more usable name. A standard form can be required, e.g. "sc_XXXXXX.pro", where XXXXXX has a logical text.

Figure 14:
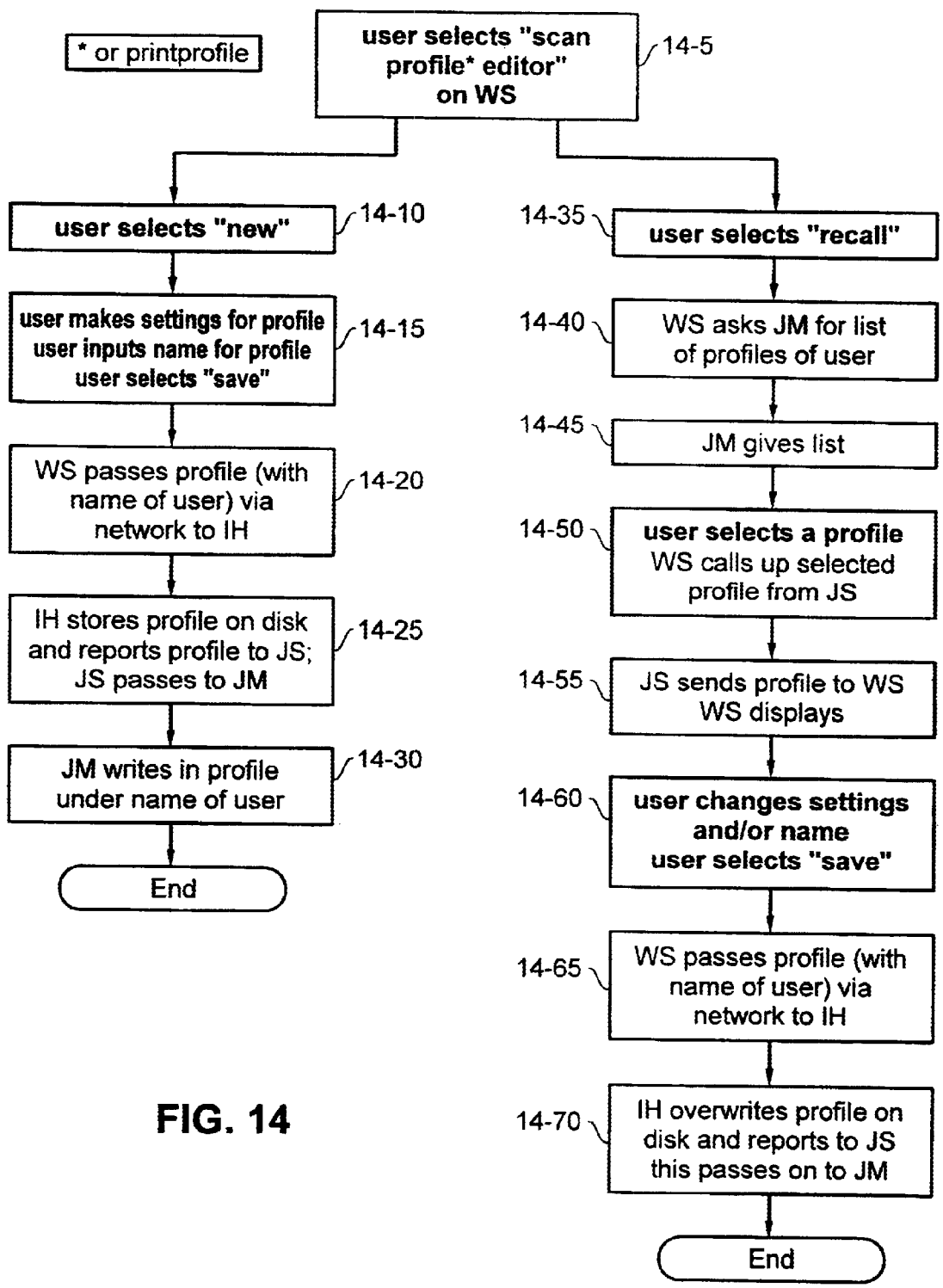

FIG. 14 shows the procedure in making a scan profile or changing an existing scan profile from a workstation. This requires a program specially intended to communicate with the apparatus. This program, which will hereinafter be referred to as the "WS program" has its own user identification and authorisation procedure so that the JobManager 12 does not need to repeat this check.

In the WS program a user selects (14-5) a "scan profile editor". Within this subprogram the user can select (14-10) a "new" function, by means of which a new profile is prepared. On the screen at his workstation the user then has a window in which he can set (14-15) all the scan parameters. This can, for example, be an image identical to the image on the display 60 of the apparatus operator control unit 13, with an image of the operator control keys, which can then be operated by means of a cursor, although some other representation can be given.

If the user has made the settings and given a name for the profile, then on his command ("save") the profile is transmitted (14-20) via the network to the InputHandler 15, which stores (14-25) it in the storage unit 20 and reports it to the JobServer 21. This passes information concerning the profile to the JobManager 12, which enters (14-30) it in its administration system.

The user can also amend an existing scan profile, both in respect of the scan parameter settings and the name. This is possible by selecting (14-35) a "recall" function in the scan profile editor. The WS program then asks (14-40) the JobManager 12 for the scan profiles stored under the name of the relevant user, and the JobManager 12 gives (14-45) an overview, which is then displayed on the workstation screen for selection. After the user has selected (14-50) a specific scan profile, the WS program asks the JobServer 21 for the contents of that profile, and the JobServer 21 brings it from the storage device 20 and sends (14-55) it via the OutputHandler 16, whereafter it is displayed on the workstation screen. The user can now make changes (14-60) and use the "save" command to save them, whereupon the WS program sends (14-65) the new contents of the profile to the apparatus, where it is again stored (14-70) in the storage device 20 and reported to the JobManager 12.

The name of a scan profile always has the extension ".pro".

Fetching a Scan File Using Workstation

Figure 15:
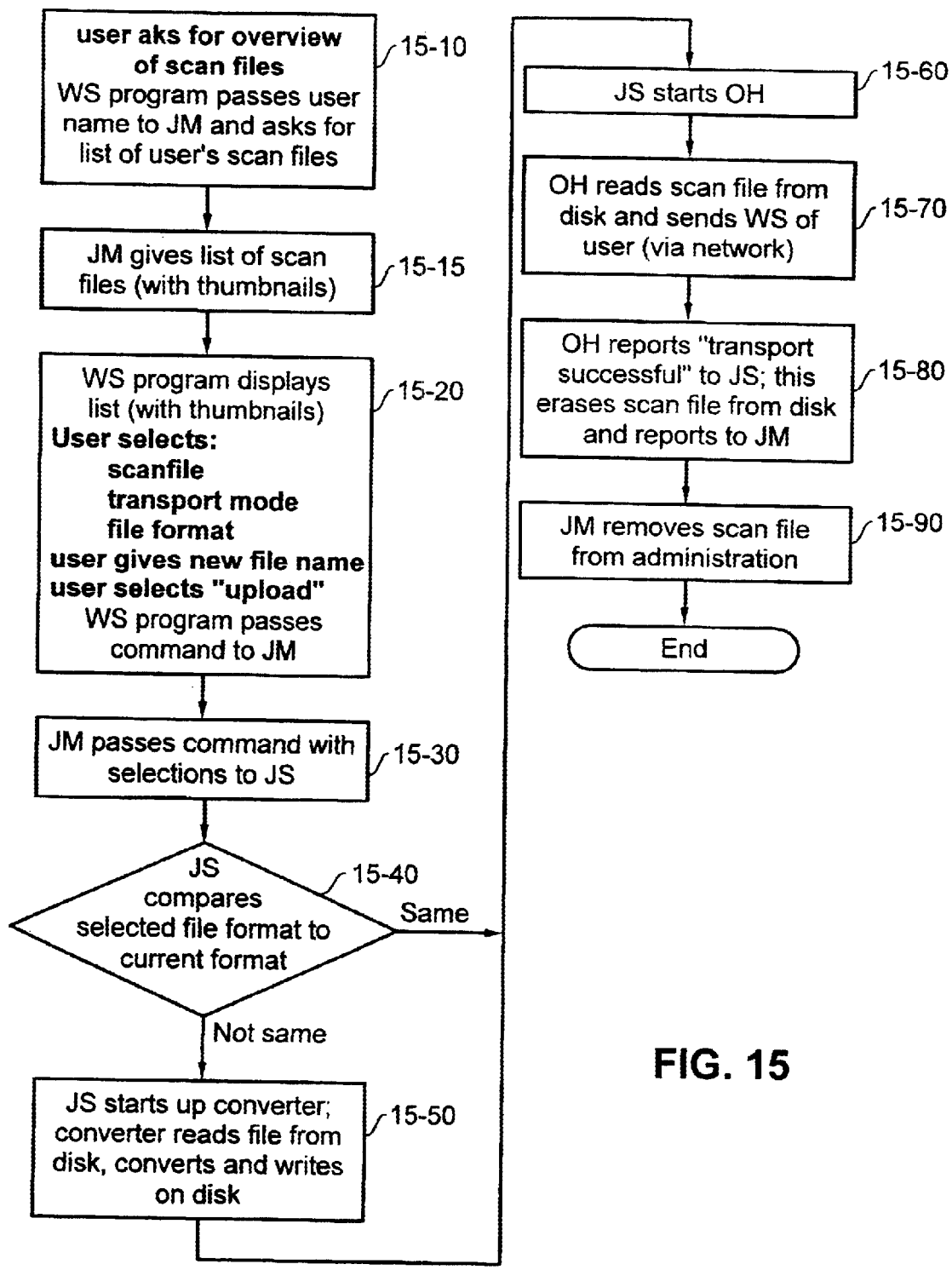
FIG. 15 is a flow diagram of a procedure for fetching a scan profile from the apparatus according to an embodiment of the invention.

FIG. 15 shows the procedure when a user wishes to fetch a scan file stored there under his name, using his workstation.

The WS program for communication with the apparatus is also required for this operation. As already stated, this program is provided with its own user identification and authorisation procedure.

In the WS program, the user now selects a presentation function for all the scan files stored under his name in the storage unit 20. The WS program then asks (15-10) for the list of these from the JobManager 12, which compiles the list from its own administration system and sends (15-15) it back. In addition, the JobManager 12 by means of the JobServer 21 and OutputHandler 16 sends to the workstation the thumbnail belonging to each scan file. This can, for example, also be the thumbnail of the first page of a multi-page document.

The WS program now displays (15-20) on the workstation screen the list of scan files with the associated thumbnails for selection by the user. The user is also offered a choice for the transport mode (encrypted or not), the required format of the file, and the name under which the file is to be imported (note that the file still has an automatically generated name which contains no information as to the contents). After making the settings, the user selects the function "upload", whereupon the WS program sends a request to the JobManager 12 to forward the selected file. The JobManager passes (15-30) the order to the JobServer 21, which compares (15-40) the required file format with the current format in which the file is stored in the storage unit 20. If the two formats are different (15-50), the JobServer 21 gives the conversion unit 28 an order to read out the file, convert it, and store it again in the storage unit 20.

The JobServer then starts (15-60) the OutputHandler 16 to transmit (15-70) the file to the workstation. When it has completed its task, it reports (15-80) this to the JobServer 21, which erases the file from the storage unit 20 and passes it on to the JobManager 12, which in turn removes (15-90) the file from its administration system. Alternatively, the scan file can be kept until the user removes it actively.

Print Profile

The use of a profile having previously prepared settings can also be used for interactive printing of print files (described with reference to FIG. 8). In that case, in the step in which the print files are displayed for selection, the profiles, now referred to as print profiles, are also displayed. Prior to selection of a print file, the user can now first select a print profile, whereafter the operator control unit 13 adapts the settings thereto. The user then selects a print file, whereupon everything progresses as already described with reference to FIG. 8. If the user does not select a profile, then the default settings remain operative.

The making and storing of print profiles parallels the making and storing of scan profiles. In this connection reference should be made to the descriptions of FIGS. 13 and 14. A print profile will have the general name "pr_XXXXXX.pro", where XXXXXX has a logical content.

Deferred Copying

A "deferred copying" function is also supported by the described embodiments of scanning and printing. In this function, an original document or a set of documents is scanned, whereafter the digital image data thus generated are stored in the storage unit 20 under the user's name, and can then, at a later time, be brought up for printing. This progresses as follows.

The function is started by selecting the option "deferred copying" (scan now—print later) in the column above key 64A on the operator control panel. This is then followed by exactly the same procedure as described with reference to FIG. 10 or FIG. 12 for the scanning of documents, in which case the file of generated image data is now so administered by the JobManager that when the interactive print function is called up it is included in the list of files for selection for printing. The process is completed on completion of the scan job.

In order then to print the file, a user should select the option "printer" in the column above key 64A on the operator control panel, in which case as already described the scan files of "deferred copying" jobs are now also displayed for selection in the column above key 64E. The printing process is fully identical to that described with reference to FIG. 8.

In an alternative embodiment, in the case of "deferred printing", after completion of the scanning process the scan file is not stored as an interactive print job, but is added by the JobManager 12 to the print queue for automatic print jobs (AP queue) and automatically printed when it comes to the head of the queue. This embodiment is suitable particularly for situations in which the apparatus is placed in a central reprographic department, in which jobs are processed in a continuous series.

Special Applications

A print file of the second type (IP) can be provided with an extra attribute by the WS program, so that when received in the apparatus according to the invention it is stored in the storage unit 20 under the name of a user other than the sender. In this way, a specific file can also be distributed over a group of users. The recipients, who can be warned by e-mail, then have the opportunity of having the file actually printed for their own use. If required, the recipients can also first bring up the intended print file to their workstation, in exactly the same way as described with reference to FIG. 15 in connection with scan files. After inspection of the file and the decision that it should really be printed, they then send the file, optionally as a file of the first or second type, back to the apparatus for printing there.

The possibility of receiving print files from other users can be programmed for a specific user by means of the JobManager, there being added to the entry of that user in the database of the accounting and security unit 27 a data item which either authorises the receipt of such files or not. This data item can if required be so extended that it authorises only the receipt of files from specific other users referred to in the data item, and hence obstructs those of other users.

Handling Fatal Interruptions

The invention also includes a method of saving a print file or scan file upon a fatal interruption of a copying, printing or scanning process. By the term "fatal interruption" is meant an interruption that leads to abortion of the running process. Examples of fatal interruptions are a full stop command entered by an operator at the operator control panel of the apparatus, and an irrecoverable error in the system, including an engine breakdown.

In many conventional devices, an image file involved in a process aborted by an operator command is lost. However, according to the present invention, the image file is stored in the storage unit 20 under the name of the user, or, if it was already stored in that way, it is left so. Progress information, i.e. information as to what part of the job had been processed already at the moment of the interruption, and possibly the settings selected for the job by the operator, is also stored. A more detailed description of the storage procedure and the way in which the user may restart the job is given below for print, scan and copy jobs. The description below refers to a fatal interruption having the form of a stop command, but it is also applicable when the job is interrupted by an irrecoverable system error.

Figure 16:
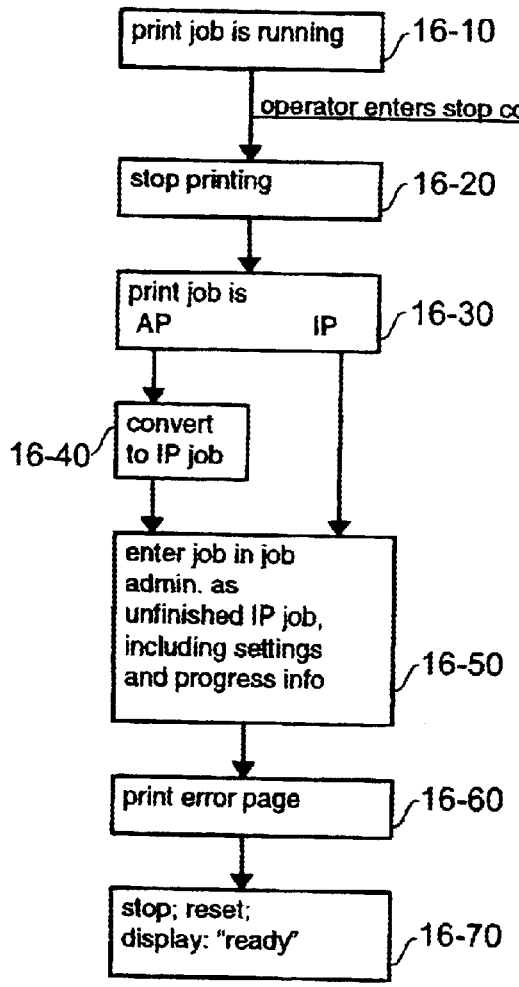
FIG. 16 is a flow diagram of the procedure followed upon a stop command during a print job according to an embodiment of the invention.

FIG. 16 shows a flow chart of the procedure followed by the JobManager 12 when an operator enters a stop command at the console 160 during (16-10) a print job. First, the JobManager instructs the CopyController to stop (16-20) the printing process.

If (16-30) the aborted job was an automatic print job, the JobManager converts (16-40) the description of the job in its job administration into an interactive print job, and if it was an interactive print job, it is left so. Moreover, the JobManager 12 marks (16-50) the job as an unfinished job. Data relating to the selected apparatus settings (e.g. finishing parameters) and the progress of the job are stored in connection to the print data.

An error page is printed (16-60), stating that the job was aborted and for what reason. Also, the progress information is printed on the error page as well as instructions for restarting the job. After that the apparatus is reset (e.g. the set memory is cleared) for a new job and on the display of the operating panel 160 the message "ready" is shown (16-70).

The job can now always be run again completely or partially at a later moment. In that case, the user has to select the job and start it in the same way as an interactive print job. It so happens the JobManager 12 includes aborted jobs in the selection list presented to the operator as shown in FIG. 4. If the user does so, the JobManager 12 prompts the user, via the operator control unit 13, for selection of one of the options, namely to completely reprint the job, or to only print the remaining part of it. In both cases the job settings, which have been stored at the time of the interruption, are automatically reselected in order to assure that the printed output exactly conforms to the aborted job.

Figure 17:
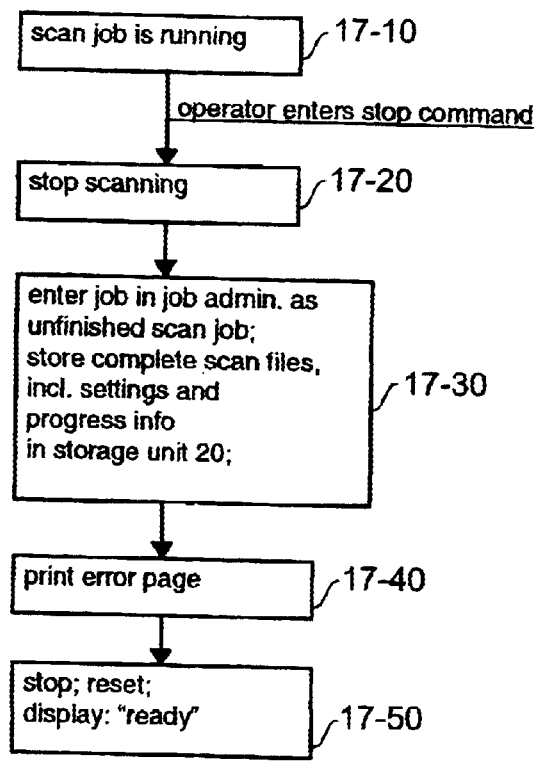
FIG. 17 is a flow diagram of the procedure followed upon a stop command during a scan job according to an embodiment of the invention.

FIG. 17 shows a flow chart of the procedure followed by the JobManager 12 when an operator enters a stop command at the console 160 during a scan job (17-10). In that case (17-20), the scan files already generated (however, only those for documents that were completely scanned), are read out from the set memory 4 and stored (17-30) in the storage unit 20 under the name of the user, together with progress information (i.e. the number of documents already scanned) and the settings selected for the job by the operator. The JobManager 12 automatically generates a name for the file. Then an error page is printed (17-40), stating that the job was aborted and for what reason, and also stating the name generated for the stored file and the progress information as well as instructions for restarting the job. The job is marked as an unfinished job in the job administration by the JobManager. After that the apparatus is reset and returns to its default state, copying, and on the display of the operating panel 160 the message "ready" is shown (17-50).

At a later moment, the user can recall the aborted scan job by selecting it at the operator control panel (aborted scan jobs are presented for selection, after an operator has selected his name, together with the scan profiles, on the operator control panel display), and finish it. In that case, the operator may load the entire document set into the input tray of the document feeder, and the machine will automatically reselect the job settings, feed through the documents already scanned and then start scanning the remaining documents, appending the scan files generated to the ones already stored.

Figure 18:
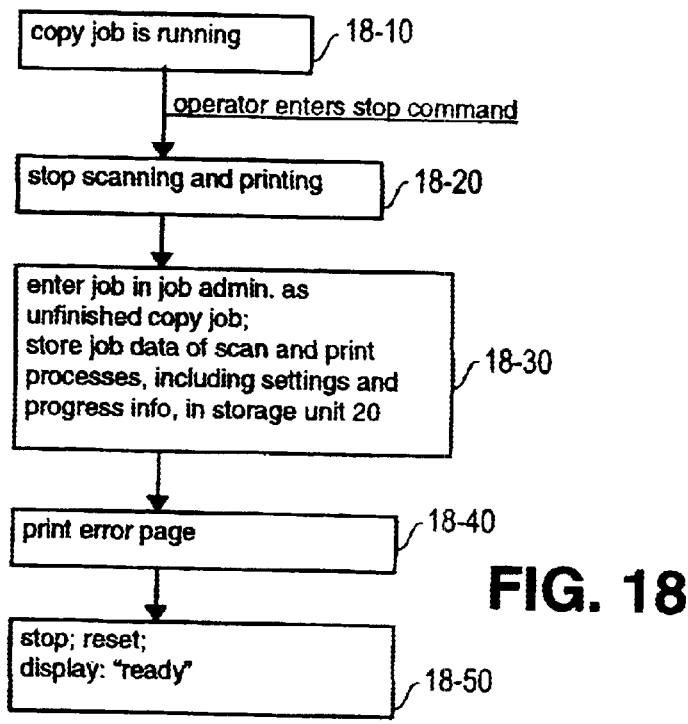
FIG. 18 is a flow diagram of the procedure followed upon a stop command during a copy job according to an embodiment of the invention.

If the aborted job was a copy job, it depends on the progress of the job, what happens. FIG. 18 shows a flow chart of the procedure followed by the JobManager 12 when an operator enters a stop command at the console during a copy job (18-10).

The scan and print processes, if they are running (only one of them, or both, could be running at the moment of the interruption), are stopped (18-20) at a command of the JobManager 12, which enters the aborted job as an unfinished copy job in its job administration. The scan files relating to documents already scanned entirely are read out from the set memory 4 and stored (18-30) in the storage unit 20 under the name of the user (if the user is not known, under a default name, such as "copy user") and an automatically generated file name. It is possible that not all documents have been scanned yet at the moment of the interruption. Further, progress information as to the printing process, if this was already running, is stored, and also the job settings selected by the operator. An error page is printed (18-40), stating that the job was aborted and for what reason, the automatically generated file name and the progress information of the scan process as well as the print process. Also, the error page contains instructions for restarting the job. After that the apparatus is for a new job and on the display of the operating panel 160 the message "ready" is shown (18-50).

When the user wants to resume the aborted copy job, he must select it in the same way as an interactive print job (aborted copy jobs are listed among IP jobs in the selection list as shown in FIG. 4). If not all documents were scanned before the job was interrupted, the JobManager 12 asks the operator via the operator control unit 13 to load the entire document set into the input tray of the document feeder, and then automatically reselects the job settings, has the document feeder feed through the documents already scanned and then starts the scanning process for the remaining documents. The scan files generated are appended to the ones already stored.

In the meantime, the JobManager 12 prompts the user, via the operator control unit 13, for selection of one of the options, namely to completely reprint the job, or to only print the remaining part of it. In both cases the job settings, which have been stored at the time of the interruption, are automatically reselected.

The mechanism for saving image data described above is also used in case of an irrecoverable system error, such as an engine breakdown. This will now be described.

Figure 19:
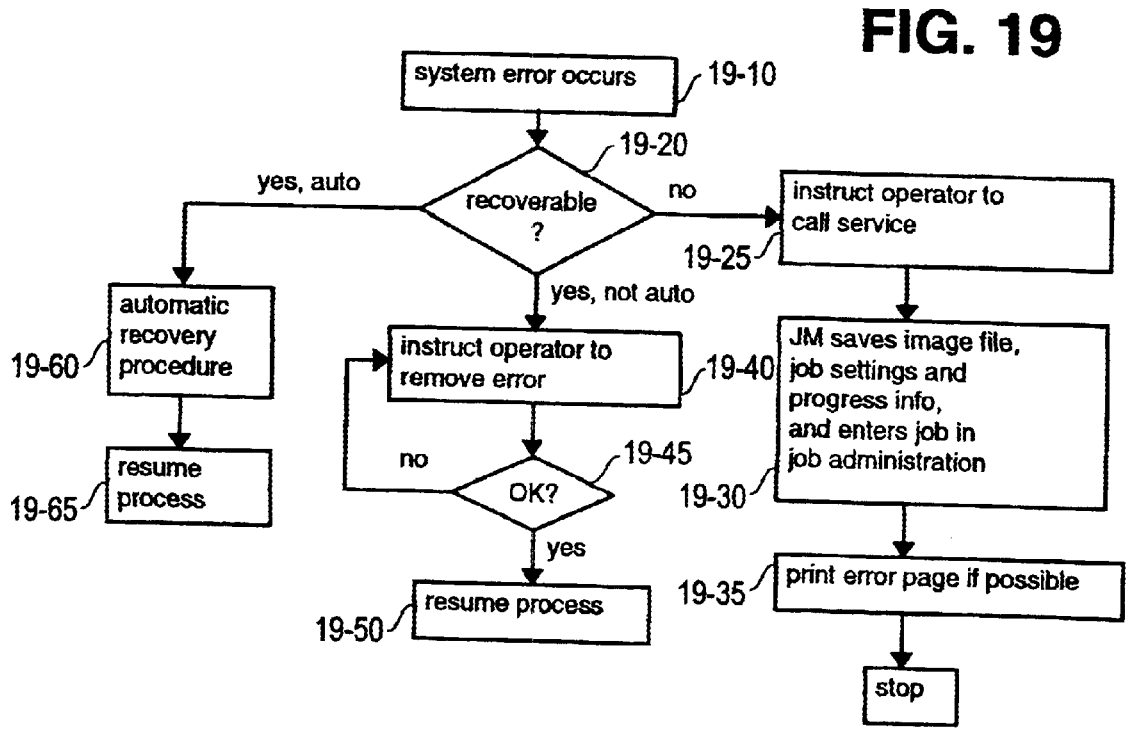
FIG. 19 is a flow diagram of the procedure followed upon a system error according to an embodiment of the invention.

CopyController 6, which controls the engine processes, is connected to a plurality of sensors in the machine (not shown in the drawings), in order to control and to monitor the scanning and printing processes. FIG. 19 shows a flow chart of the procedure followed by the CopyController upon a system error.

When a malfunction of the system occurs (19-10), the CopyController 6 decides (19-20) if the error can be recovered automatically, not-automatically (i.e. by an action of the operator) or not at all, in which latter case a service engineer should be called in. An example of a not-automatically recoverable error is a paper jam in the printer unit 130, which can be remedied by an operator clearing the paper path and instructing the machine to resume the process.

Generally, when the CopyController cannot recover the error itself, it instructs (19-40, 19-45, 19-50) the operator what to do, by displaying instructions on the display in the operator control panel 160. In the case of an irrecoverable error, it may e.g. display (19-25) the text: "Call service engineer".

Further, the CopyController 6 reports the system error to the JobManager 12, which, in case of an irrecoverable error, stores (19-30) data relating to the aborted job in the storage unit 20. This procedure is analogous to the ones described with respect to FIGS. 16–18, and will not be described further here.

An error page is printed (19-35), stating that the job was aborted and for what reason. Of course, an error page can only be printed if the printer unit is still functioning. In the case that the job was interrupted by a system error, the information is stored and is printed at the moment the malfunction has been remedied.

Because it may happen that an aborted job is not resumed but simply repeated, the JobManager 12 has a function to automatically (19-60,19-65) remove image files saved in the way described above after the elapse of a preselected time.

In a different embodiment, progress information on print jobs and scan files of scan jobs are always stored under the name of the user after finishing each page. In this embodiment, the CopyController 6 reports each finished page to the JobManager 12, which enters the relevant information in its job administration system. In this way, even in the case of an error condition of the controllers, data are safely stored, and aborted jobs can always be resumed.

The invention being thus described, it will be obvious that the same may be varied in many ways. Such variations are not to be regarded as departure from the spirit and scope of the invention, and all such modifications as would as would be obvious to one skilled in the art are intended to be included within the scope of the following claims.

What is claimed is:

1. A digital image processing apparatus for use by a plurality of users, comprising:
    an image conversion unit,
    a local memory,
    a local operator control unit, integrated in the apparatus, provided with inputting means and a display, for a user to give operating commands to the apparatus,
    a management unit connected to said local memory, for controlling image conversion jobs to be performed for a user by the digital image processing apparatus,
    said management unit maintaining a plurality of logic storage spaces in said local memory, each allocated to a respective user, and
    said management unit being capable of storing data relating to an image conversion job for a user, in the logic storage space allocated to the user, from which logic storage space the data can exclusively be retrieved upon a command from a user, the command specifying the relevant job,
    said management unit, when handling an image conversion job, checks whether the job can be performed completely, and in the case that the job cannot be performed completely, enters the data relating to the job and information on a progress of the job in the logic storage space allocated to the relevant user.

2. The apparatus according to claim 1, wherein said management unit includes means for having a document printed by the apparatus, said document stating that the data relating to the job has been entered in the logic storage space allocated to the relevant user.

3. The apparatus according to claim 1, wherein said management unit includes means for making an inventory of image conversion jobs of which data are stored in the logic storage space allocated to a respective user, and for presenting at least a sub-set of the jobs on the display of said operator control unit, for selection for the purpose of processing.

4. The apparatus according to claim 1,
    wherein said management unit manages a directory structure in said local memory, said logic storage spaces being formed by directories.

5. The apparatus according to claim 1,
    wherein said management unit manages a database in said local memory, said logic storage spaces being formed by entries in the database.

6. A digital image processing apparatus, comprising:

a printer unit, a local memory, a local operator control unit, integrated in the apparatus, provided with a keyboard and a display, for a user to give operating commands to the apparatus, a network connection unit for coupling to a network for the purpose of communication with a digital external environment having at least a number of workstations of users, a management unit connected to said printer unit, said local memory and said network connection unit and, via the network connection unit, to the workstations, said management unit maintaining logic storage spaces in said local memory, each allocated to a respective user, said network connection unit being suitable for receiving from a user's workstation files of digital data for printing by said printer unit, the files containing an identification of the relevant user and being either of a first type or of a second type, wherein the first type is formed by files which are to be printed immediately, and the second type is formed by files which must be stored in said local memory and may only be printed at a command from the operator control unit, which command identifies the relevant file, wherein when said management unit receives from the user's workstation a file of the second type for printing it stores the file in the logic storage space of the relevant user and passes it for printing to said printer unit only on a command from said local operator control unit, said management unit also maintaining a list of authorised users, wherein when said management unit receives from a user's workstation a file of the first type for printing said management unit checks whether the relevant user is registered in the list of authorised users, and if so, prints the file, and if not, converts the file to a file of the second type, if necessary allocates a logic storage space for the relevant user and stores the file in the logic storage space of the relevant user.

7. The apparatus according to claim 6, further comprising:

means for bringing said management unit into one of two possible modes, wherein, in the first mode, said management unit handles files of the first type for printing on the basis of the list of authorised users and wherein, in the second mode, said management unit automatically converts files of the first type for printing into files of the second type and, if necessary, creates a logic storage space for the relevant user, and stores the file in the logic storage space allocated the relevant user.

8. The apparatus according to claim 6, wherein at the time that a file for printing really is to be printed said management unit again checks whether the relevant user is authorised and, if not, said management unit does not process the file but stores it in the logic storage space allocated the relevant user.

9. The apparatus according to claim 8, further comprising:

means for updating a credit for each of the authorised users and for noting a user as being unauthorised if his credit is exhausted.

10. The apparatus according to claim 6, said management unit checking, when a print process is started up for a print file of any of said first or second types, whether all the conditions for the printing are met, and if not, brings the file back into the condition of a file of the second type for printing and stores the file in the logic storage space of the relevant user.

11. A digital image processing apparatus, comprising:

a printer unit, a local memory, a local operator control unit, integrated in the apparatus, provided with a keyboard and a display, for a user to give operating commands to the apparatus, a network connection unit for coupling to a network for the purpose of communication with a digital external environment having at least a number of workstations of users, a management unit connected to said printer unit, said local memory and said network connection unit and, via said network connection unit, to the workstations, said management unit maintaining logic storage spaces in said local memory, each allocated to a respective user, said network connection unit being suitable for receiving from a user's workstation files of digital data for printing by said printer unit, the files containing an identification of the relevant user and being either of a first type or of a second type, the first type being formed by files which are to be printed automatically, and the second type being formed by files which must be stored in said local memory and may only be printed at a command from said local operator control unit, which command identifies the relevant file, wherein said management unit, upon reception of a file of the second type for printing from the user's workstation, stores the file in the logic storage space allocated the relevant user and passes it for printing to the printer unit only on the command from said local operator control unit, said management unit checks, when a print process is started up for a print file of any of the first or second types, whether all the conditions for the printing are met, and if not, brings the file (back) into the condition of a file of the second type for printing and stores the file in the logic storage space of the relevant user.

12. A digital image processing apparatus, comprising:

a printer unit, a local memory, a local operator control unit, integrated in the apparatus, provided with a keyboard and a display, for a user to give operating commands to the apparatus, a network connection unit for coupling to a network for the purpose of communication with a digital external environment having at least a number of workstations of users, a management unit connected to said printer unit, said local memory and said network connection unit and, via the network connecting unit, to the workstations, said management unit maintaining logic storage spaces in the memory, each allocated to a respective user, said network connection unit being suitable for receiving from a user's workstation files of digital data for printing by said printer unit, the files containing an identification of the relevant user and being either of a first type or of a second type, the first type being formed by files which are to be printed automatically, and the second type being formed by files which must be stored in said local memory and may only be printed at a command from said local operator control unit, which command identifies the relevant file, wherein said management unit, upon reception of a file of the second type for printing from the user's workstation, stores the file in the logic storage space allocated the relevant user and passes it for printing to said printer unit only on the command from said local operator control unit, said management unit, upon the occurrence of a fatal interruption of a running print process for a print file of any of the first or second types, brings the file (back) into the condition of a file of the second type for printing and stores data relating to the job in the logic storage space of the relevant user.

13. The apparatus according to claim 12, wherein said management unit stores information concerning the progress of the print process up to the moment of a fatal interruption in the logic storage space of the relevant user as a part of the data relating to the job.

14. The apparatus according to claim 12, wherein the fatal interruption of the image conversion process originates from a stop command being inputted by a user via said local operator control unit.

15. The apparatus according to claim 12, wherein the fatal interruption of the image conversion process originates from a fatal error of the image processing apparatus.

16. The apparatus according to claim 15, wherein the fatal error of the image processing apparatus includes an engine breakdown.

17. A digital image processing apparatus, comprising:

a scanner unit, a local memory, a local operator control unit, integrated in the apparatus, provided with a keyboard and a display, for a user to give operating commands to the apparatus, a network connection unit for coupling to a network for the purpose of communication with a digital external environment having at least a number of workstations of users, a management unit connected to said scanner unit, said printer unit, said local memory and said network connection unit and, via the network connecting unit, to the workstations, said management unit maintaining logic storage spaces in said local memory, each allocated to a respective user, said management unit, upon the occurrence of a fatal interruption of a running scan process forming part of a scan job, stores the data relating to the scan job, including information concerning the progress of said job up to the moment of the fatal interruption, in the logic storage space of the relevant user.

18. The apparatus according to claim 17, wherein the fatal interruption of the image conversion process originates from a stop command being inputted by a user via said local operator control unit.

19. The apparatus according to claim 17, wherein the fatal interruption of the image conversion process originates from a fatal error of the image processing apparatus.

20. The apparatus according to claim 17, wherein the fatal error of the image processing apparatus includes an engine breakdown.

21. A digital image processing apparatus for use by a plurality of users, comprising:

an image conversion unit, a local memory, a local operator control unit, integrated in the apparatus, provided with inputting means and a display, for a user to give operating commands to the apparatus, a management unit connected to said local memory, for controlling image conversion jobs to be performed for a user by the digital image processing apparatus, said management unit maintaining a plurality of logic storage spaces in said local memory, each allocated to a respective user, and said management unit being capable of storing data relating to an image conversion job for a user, in the logic storage space allocated to the user, from which logic storage space the data can exclusively be retrieved upon a command from a user, the command specifying the relevant job, said management unit, when handling an image conversion job, checks whether the job can be performed completely, and in the case that the job cannot be performed completely, enters the data relating to the job in the logic storage space allocated to the relevant user;

wherein said management unit manages a directory structure in said local memory, said logic storage spaces being formed by directories.

22. A digital image processing apparatus for use by a plurality of users, comprising:

an image conversion unit, a local memory, a local operator control unit, integrated in the apparatus, provided with inputting means and a display, for a user to give operating commands to the apparatus, a management unit connected to said local memory, for controlling image conversion jobs to be performed for a user by the digital image processing apparatus, said management unit maintaining a plurality of logic storage spaces in said local memory, each allocated to a respective user, and said management unit being capable of storing data relating to an image conversion job for a user, in the logic storage space allocated to the user, from which logic storage space the data can exclusively be retrieved upon a command from a user, the command specifying the relevant job, said management unit, when handling an image conversion job, checks whether the job can be performed completely, and in the case that the job cannot be performed completely, enters the data relating to the job in the logic storage space allocated to the relevant user;

wherein said management unit manages a database in said local memory, said logic storage spaces being formed by entries in the database.

* * * * *